United States Patent
Zernik

(10) Patent No.: US 7,260,773 B2
(45) Date of Patent: Aug. 21, 2007

(54) DEVICE SYSTEM AND METHOD FOR DETERMINING DOCUMENT SIMILARITIES AND DIFFERENCES

(76) Inventor: Uri Zernik, 2231 South Court, Palo Alto, CA (US) 94301

( * ) Notice: Subject to any disclaimer, the term of this patent is extended or adjusted under 35 U.S.C. 154(b) by 0 days.

(21) Appl. No.: 10/495,914

(22) PCT Filed: Mar. 17, 2003

(86) PCT No.: PCT/US03/08288

§ 371 (c)(1),
(2), (4) Date: May 18, 2004

(65) Prior Publication Data

US 2005/0010863 A1    Jan. 13, 2005

Related U.S. Application Data

(63) Continuation of application No. 10/063,183, filed on Mar. 28, 2002, now abandoned.

(51) Int. Cl.
*G06F 15/00* (2006.01)
*G06F 17/21* (2006.01)
*G06F 17/27* (2006.01)

(52) U.S. Cl. ............... 715/511; 715/513; 715/517; 715/526; 707/203; 709/203

(58) Field of Classification Search ............ 715/511, 715/516, 526, 841; 707/203
See application file for complete search history.

(56) References Cited

U.S. PATENT DOCUMENTS

| | | | | |
|---|---|---|---|---|
| 4,751,740 A | 6/1988 | Wright | | 382/1 |
| 5,142,619 A | 8/1992 | Webster, III | | 345/803 |
| 5,159,667 A * | 10/1992 | Borrey et al. | | 715/500 |
| 5,261,040 A | 11/1993 | Suzuki | | 345/146 |
| 5,438,661 A | 8/1995 | Ogawa | | 395/157 |
| 5,669,007 A | 9/1997 | Tateishi | | 395/779 |
| 5,758,358 A | 5/1998 | Ebbo | | 707/203 |
| 5,794,236 A | 8/1998 | Mehrle | | 707/5 |
| 5,819,300 A | 10/1998 | Kohno et al. | | 707/511 |

(Continued)

OTHER PUBLICATIONS

Chalfonte et al., "Expressive Richness: A Comparison of Speech and Text As Media for Revision", ACM, 1991, pp. 21-26.*

(Continued)

*Primary Examiner*—William Bashore
*Assistant Examiner*—Maikhanh Nguyen
(74) *Attorney, Agent, or Firm*—Jay R. Yablon; Charles J. Kulas

(57) ABSTRACT

Two documents are processed to facilitate visual mapping and comparison. These documents comprise document subsections and the subsections comprise document subsection headers associated therewith. At least one of the first document subsection headers is juxtaposed relative to an output of second document subsection headers mapping thereto, to visually emphasize a header mapping. This header mapping is established by: mapping the first document subsections relative to the second document subsections based on identifying substantial similarities therebetween, to establish a subsection mapping therebetween; and, in relation to the subsection mapping and the association between the document subsections and the subsection headers, further mapping the first document subsection headers relative to the second document subsection headers. Several closely-related devices, systems and methods for outputting information to compare at least two documents, establishing a mapping to compare at least two documents, and highlighting similar text segments, are also disclosed.

10 Claims, 11 Drawing Sheets

U.S. PATENT DOCUMENTS

| | | | |
|---|---|---|---|
| 5,838,323 A | 11/1998 | Rose et al. .................. | 345/349 |
| 5,864,855 A * | 1/1999 | Ruocco et al. ................ | 707/10 |
| 5,890,177 A | 3/1999 | Moody et al. ............. | 707/511 |
| 5,893,908 A | 4/1999 | Cullen et al. ................... | 707/5 |
| 5,926,812 A * | 7/1999 | Hilsenrath et al. ............. | 707/5 |
| 5,950,214 A | 9/1999 | Rivette et al. ............... | 707/512 |
| 5,956,726 A | 9/1999 | Aoyama et al. ............ | 707/102 |
| 5,991,780 A | 11/1999 | Rivette et al. ............. | 707/512 |
| 5,991,782 A | 11/1999 | Miyagawa et al. ......... | 707/513 |
| 6,006,223 A | 12/1999 | Agraral et al. ................. | 707/5 |
| 6,014,663 A | 1/2000 | Rivette et al. ................ | 707/4 |
| 6,018,749 A | 1/2000 | Rivette et al. ............. | 707/525 |
| 6,038,561 A * | 3/2000 | Snyder et al. ................ | 707/6 |
| 6,044,385 A | 3/2000 | Gross et al. ............... | 707/526 |
| 6,067,551 A | 5/2000 | Brown et al. ............... | 707/203 |
| 6,098,034 A | 8/2000 | Razin et al. .................... | 704/9 |
| 6,098,071 A * | 8/2000 | Aoyama et al. ............ | 707/102 |
| 6,111,579 A | 8/2000 | Alimpich et al. ........... | 345/356 |
| 6,125,377 A | 9/2000 | Razin ......................... | 707/531 |
| 6,185,614 B1 | 2/2001 | Cuomo et al. .............. | 709/224 |
| 6,199,098 B1 | 3/2001 | Jones et al. ................. | 709/203 |
| 6,240,409 B1 | 5/2001 | Aiken .......................... | 707/4 |
| 6,266,683 B1 | 7/2001 | Yehuda et al. ............. | 707/512 |
| 6,279,015 B1 | 8/2001 | Fong et al. ................. | 707/523 |
| 6,298,357 B1 | 10/2001 | Wexler et al. .............. | 707/513 |
| 6,324,555 B1* | 11/2001 | Sites .......................... | 715/517 |
| 6,502,112 B1* | 12/2002 | Baisley ....................... | 715/513 |
| 6,519,557 B1* | 2/2003 | Emens et al. ................... | 704/8 |
| 6,526,410 B1 | 2/2003 | Aoyama et al. ............ | 707/102 |
| 6,560,620 B1 | 5/2003 | Ching ........................ | 715/511 |
| 6,596,030 B2* | 7/2003 | Ball et al. ................... | 715/511 |
| 6,618,727 B1* | 9/2003 | Wheeler et al. .............. | 707/10 |
| 6,658,626 B1* | 12/2003 | Aiken ........................ | 715/526 |
| 6,742,003 B2* | 5/2004 | Heckerman et al. ..... | 707/104.1 |
| 6,978,420 B2* | 12/2005 | Ching ........................ | 715/511 |
| 6,990,628 B1* | 1/2006 | Palmer et al. ............... | 715/500 |
| 7,039,238 B2* | 5/2006 | Sonmez et al. ............. | 382/219 |
| 2001/0035882 A1 | 11/2001 | Stoakley et al. ............ | 345/779 |
| 2001/0039505 A1 | 11/2001 | Cronin .......................... | 705/7 |
| 2002/0052730 A1* | 5/2002 | Nakao ......................... | 704/10 |
| 2002/0111968 A1 | 8/2002 | Ching ........................ | 707/514 |
| 2003/0101164 A1* | 5/2003 | Pic et al. ........................ | 707/1 |
| 2003/0120647 A1* | 6/2003 | Aiken et al. ................... | 707/3 |
| 2003/0145278 A1* | 7/2003 | Nielsen ...................... | 715/511 |

OTHER PUBLICATIONS

Chawathe et al., "Change Detection is Hierachically Structured Information", ACM, 1996, pp. 493-504.*

Wang et al. "Structural Matching and Discovery in Document Databases", Proceedings of the 1997 ACM SIGMOD Internation conference on Management of Data, Arizona, US, 1997, pp. 560-563.*

Mani et al. "Summarizing Similarities and Differences Among Related Documents", chapter 23, The MIT Press, London, 1999, pp. 357-379.*

Dittenbach et al. "Uncovering hierarchical structure in data using the growing hierarchical self-organizing map", Neurocomputing 48, 2002, pp. 199-216.*

Douglis et al., "Tracking and Viewing Changes on the Web," USENIX Technical Conference, 1996, pp. 1-13.*

Bartell et al., "Representing Documents Using an Explicit Model of Their Similarities," Journal of The American Society for Information Science, 1995, pp. 03-20.*

Rahm et al., "A Survey of Approaches To Automatic Schema Matching," The VLDB Journal, 2001, pp. 334-350.*

* cited by examiner

CHAIR

Background of the invention: — 102

After standing up for a long time, people need to sit down. Beds enable them to lie down, but not sit easily with support. Carpets provide a comfortable place to sit in a cross legged or other position, but don't allow a halfway position between sitting and standing. — 101

Objects of the invention — 104

It is therefore an object of the invention to provide a device for a person to sit in an intermediate position between standing, and lying down or sitting on a rug. — 103

Summary — 108

An elevated horizontal rectangular platform is supported by four vertical elongate legs, and provides a seat upon which a user can rest his or her posterior. A vertical rectangular member rising upwardly from the horizontal rectangular platform provides a back rest to provide support against which the user can rest his or her back. — 107

Drawings — 106

Figure 1 shows a chair according to the preferred embodiment of the invention. — 105

Detailed description

As shown in Fig. 1, the preferred embodiment has three main elements: i) Seat: A horizontal rectangular platform to be referred to as a seat 1 is elevated above the ground, and provides a locale for resting of a posterior. ii) Legs: Four vertical elongate members to be referred to as legs 2 elevate seat 1 about 18 inches above the ground. iii) Back: A vertical rectangular member to be referred to as back 3 is attached to and rises upwardly from seat 1, intersecting seat 1 along a line.

Claims

1. A seating apparatus, comprising: a seat supported from below by four vertical elongate legs.

2. The apparatus of claim 1, further comprising a back attached to and rising upwardly from said seat

Abstract

An elevated horizontal rectangular platform disclosed herein is supported by four vertical elongate legs, and provides a seat upon which a user can rest his or her posterior. Also disclosed is a vertical rectangular member rising upwardly from the horizontal rectangular platform which provides a back rest to provide support against which the user can rest his or her back.

FIG. 1

IMPROVED SEATING DEVICE

Background ~ 202

After standing up for a long time, people become tired and would like to sit down. A Bed enables them to lie down, but not to sit easily with support. Carpets provide a comfortable place to sit in a cross legged or other position, but don't allow an intermediate position between sitting and standing.

Figure ~ 204 — 201

Figure 1 shows a chair according to the preferred embodiment of the invention.

Summary ~ 206 — 203

An elevated horizontal rectangular platform is supported by four vertical elongate legs, and provides a seat upon which a user can rest his or her buttocks. A vertical rectangular member rising upwardly from the horizontal rectangular platform provides a back rest to provide support against which the user can rest his or her back. Optional arm rests provide a locale for the user to rest his or her arms.

This enables a person to sit in an intermediate position between standing, and lying down or sitting on a rug. — 205

Detailed description of the Invention

As shown in Fig. 1, the preferred embodiment has three main elements. First, four vertical elongate members to be referred to as legs 2 elevate horizontal rectangular platform to be referred to as a seat 1 about 18 inches above the ground. Second, seat 1 is elevated above the ground, and provides a locale for resting of a buttocks. Finally, a vertical rectangular member to be referred to as back 3 is attached to and rises upwardly from seat 1, intersecting seat 1 along a line. Optionally, along the two sides of seat 1 and elevated therefrom, a pair or armrests 4 are provided.

I claim:

1. A seating apparatus, comprising: a seat (1) supported from below by four vertical elongate legs (2).

2. The apparatus of claim 1, further comprising a back (3) attached to and rising upwardly from said seat (1)

3. The apparatus of claim 1, further comprising a pair of armrests (4) elevated from two sides of said seat (1).

4. The apparatus of claim 2, further comprising a pair of armrests (4) elevated from two sides of said seat (1).

Abstract

An elevated horizontal rectangular platform (1) disclosed in a preferred embodiment herein is supported by four vertical elongate legs (2), and provides a seat upon which a user can rest his or her posterior. Also disclosed is a vertical rectangular member rising upwardly from the horizontal rectangular platform which provides a back rest (3) to provide support against which the user can rest his or her back.

FIG. 2

| | | |
|---|---|---|
| ⊟ IMPROVED SEATING DEVICE | ○ | CHAIR |
|     Background | ○ | Background of the invention |
|     Figure | ○ | Drawings |
|     Summary | ○ | Summary |
|     Detailed description of the invention | ○ | Detailed description |
|   ⊟ I claim: | ○ | Claims |
|     ⊟ 1. A seating apparatus, | ○ | 1. A seating apparatus, |
|       ⊟ 2. The apparatus of claim 1, | ○ | 2. The apparatus of claim 1, |
|       3. The apparatus of claim 1, | ○ | (no match) |
|       4. The apparatus of claim 2, | ○ | (no match) |
|     Abstract | ○ | Abstract |

CHAIR
Background of the invention  } 1002

IMPROVED SEATING DEVICE
Background

102 — Background of the invention

After standing up for a long time, people need to sit down. Beds enable them to lie down, but not sit easily with support. Carpets provide a comfortable place to sit in a cross legged or other position, but don't allow a halfway position between Background — 202

After standing up for a long time, people become tired and would like to sit down. A Bed enables them to lie down, but not to sit easily with support. Carpets provide a comfortable place to sit in a cross legged or other position, but don't allow an intermediate position between sitting and standing.

CHAIR            O IMPROVED SEATING DEVICE
Background of the invention    O Background Background of the invention After standing up for a long time, people need to sit down. Beds enable them to lie down, but not sit easily with support. Carpets provide a comfortable place to sit in a cross legged or other position, but don't allow a halfway position between Background |

After standing up for a long time, people become tired and would like to sit down. A Bed enables them to lie down, but not to sit easily with support. Carpets provide a comfortable place to sit in a cross legged or other position, but don't allow an intermediate position between sitting and standing.

Substitution list of changes found comparing:

CHAIR      -to-     IMPROVED SEATING DEVICE
Background of the invention      Background

- ☑ 1 time: of the invention was deleted
- ☑ 1 time: need was replaced by become tired and would like
- ☐ 1 time: Beds enable was replaced by A bed enables
- ☐ 1 time: to was added
- ☐ 1 time: a halfway was replaced by an intermediate

| Offshore Retention Agreement | OffshoreRetentionAgreement_79 | Changes | Onshore Trust and Retention Agreement | OnshoreTrustandReten |
|---|---|---|---|---|
| ⊟ Offshore Retention Agreement | | 419/647 | ⊟ Onshore Trust and Retention Agreement | OnshoreTrustandRetentionAgreement |
| Preface | | 10/24 | Preface | |
| Recitals | | 2/13 | Recitals | |
| ⊟ ARTICLE II NOTICES AND INFORMATION REQUIREMENTS | | 11/24 | ARTICLE II NOTICES AND INFORMATION REQUIREMENTS | |
| ⊟ Section 2.1 Construction Period Certificates and Notices of Opr | | 6/15 | Section 2.1 Construction Period Certificates and Notices of Oper | |
| (a) Construction Progress Certificate; Independent Engineer's | | 1/2 | (a) Construction Progress Certificate; Independent Engineer's C | |
| (b) Notice of Operating and Maintenance Costs. | | 2/3 | (b) Notice of Operating and Maintenance Costs. | |
| ⊟ (c) Notices of Senior Debt Service. | | 3/3 | (c) Notices of Senior Debt Service. | |
| ⊟ (i) Promptly following the date of Initial disbursement of | | 1/4 | (i) Promptly following the date of initial disbursement of t | |
| A. a schedule of the amounts of all scheduled princi- pal, int | | 0/1 | A. a schedule of the amounts of all scheduled princi- pal, into | |
| B. in the case of IDBI, any Scheduled Fees payable in respe | | 0/1 | B. in the case of IDBI, any Scheduled Fees payable in respect | |
| C. any Fees (other than any Scheduled Fees) payable to or | | 0/1 | C. any Fees (other than any Scheduled Fees) payable to or or | |
| D. the date on which each such payment is due and the dat | | 0/1 | D. the date on which each such payment is due and the date. | |
| E. the payee or payees authorized to receive payment and t | | 0/1 | E. the payee or payees authorized to receive payment and the | |
| (ii) Each Secured Party, any Additional Permitted Lender, and | | 1/1 | (ii) Each Secured Party, any Additional Permitted Lender, and t | |
| (iii) Any Person which has submitted any certificate or notice | | 1/1 | (iii) Any Person which has submitted any certificate or notice p | |
| ⊟ Section 2.2 Provision of Notices. | | 3/4 | Section 2.2 Provision of Notices. | |
| Section 2.3 Details of Retention Accounts. | | 1/2 | Section 2.3 Details of Retention Accounts. | |
| Section 2.4 No Waiver. | | 1/2 | Section 2.4 No Waiver. | |
| ⊟ ARTICLE III RETENTION ACCOUNTS | | 397/356 | ARTICLE III RETENTION ACCOUNTS | |
| ⊟ Section 3.1 Establishment of Accounts. | | 32/33 | Section 3.1 Establishment of Accounts. | |
| ⊟ (a) Offshore Retention Account. | | 20/26 | (i) Sub-accounts. | |
| ⊟ (b) DPC Dollar Accounts. | | 10/19 | (a) DPC Rupee Accounts. | |
| ⊟ (i) On or before the Initial Borrowing Date, the Company shall | | 8/8 | (i) On or before the Initial Borrowing Date, the Onshore Trustee | |
| (A) a special purpose account entitled "DPC USD Const Acct | | 2/2 | { Section deleted } | |
| (B) a special purpose account entitled "DPC USD Oper Acct | | 2/2 | { Section deleted } | |
| (C) a special purpose account entitled "DPC USD Distr Acct | | 3/3 | (C) an account entitled "DPC Rupee Distribution Account" (the | |
| (ii) Subject to the terms of Article IV hereof, the Company sha | | 1/1 | (ii) Subject to the terms of Article IV hereof, the Company shall | |
| (c) Vesting and Control of Offshore Retention Account. | | 1/1 | { Section deleted } | |
| (d) Conversion into Dollars. | | 1/1 | { Section deleted } | |
| ⊟ Section 3.2 Investments and Conversion. | | 11/12 | Section 3.2 Investments and Conversion. | |
| ⊟ Section 3.3 Deposits to the Offshore Retention Account. | | 63/65 | Section 3.3 Determination of Order. | |

Fig. 15

Agreement (I) shall be deemed delivered to (A) IDBI, the Rupee Lenders and the Eximbank Guarantors when submitted to IDBI and (B) the Agent and the Banks when submitted to the Agent and (II) shall be delivered to OPIC and also shall be delivered, except as otherwise agreed in writing between the Company and OPIC and notified in writing to the other parties hereto, to the OPIC Paying Agent.

(c) Any certificates, notices, directions, approvals, waivers.

(c) Any certificates, notices, directions, approvals, waivers, decisions as to acceptability, consents, assurances of reasonable satisfaction or other communications required to be submitted by or on behalf of any Credit Party, Secured Party, Secured Creditor, Senior Lender or Secured Lender pursuant to this Offshore Retention Agreement may be submitted by (i) IDBI on behalf of the Rupee Lenders and the Eximbank Guarantors, (ii) the Agent on behalf of the Banks and (iii) either OPIC or the OPIC Paying Agent on behalf of OPIC. Any notice submitted by IDBI or, as the case may be, the Agent, shall specify whether or not it has been submitted by IDBI or, as the case may be, the Agent, on behalf of the Rupee Lenders and/or the Eximbank Guarantors or, as the case may be, the Banks.

Section 2.3 Details of Retention Accounts.

Section 2.3 Details of Retention Accounts.

Promptly following the establishment thereof, the Offshore Collateral Agent shall provide to the Onshore Trustee, each Secured Creditor and the Company a notice (x) containing the number and designation of the Onshore Retention Account and each sub-account thereof maintained by it under this Offshore Retention Agreement and (y) containing the number and designation of each DPC Dollar Account maintained by the Pledgeholder subject to the Pledgeholder Agreement.

Section 2.4 No Waiver.

Section 2.4 No Waiver.

No certificate or notice delivered pursuant to this Offshore Retention Agreement shall be held to establish, or to estop any Secured Party from asserting, the existence or nonexistence of any set of facts or to waive the right of any Secured Party to require the existence or non-existence of any set of facts.

shall be deemed delivered to (A) IDBI, the Rupee Lenders and the Eximbank Guarantors when submitted to IDBI, and (B) the Agent and the Banks when submitted to the Agent, and (II) shall be delivered to OPIC and also shall be delivered, except as otherwise agreed in writing between the Company and OPIC and notified in writing to the other parties hereto, to the OPIC Paying Agent.

(c) Any certificates, notices, directions, approvals, waivers.

(c) Any certificates, notices, directions, approvals, waivers, decisions as to acceptability, consents, assurances of reasonable satisfaction or other communications required to be submitted by or on behalf of any Credit Party, Secured Party, Secured Creditor, Senior Lender or Secured Lender pursuant to this Onshore TRA may be submitted by (i) IDBI on behalf of the Rupee Lenders and the Eximbank Guarantors, (ii) the Agent on behalf of the Banks and (iii) either OPIC or the OPIC Paying Agent on behalf of OPIC. Any notice submitted by IDBI or, as the case may be, the Agent shall specify whether or not it has been submitted by IDBI or, as the case may be, the Agent, on behalf of the Rupee Lenders and/or the Eximbank Guarantors or, as the case may be, the Banks.

Section 2.3 Details of Retention Accounts.

Section 2.3 Details of Retention Accounts.

Promptly following the establishment thereof, the Onshore Trustee shall provide to the Offshore Collateral Agent, each Secured Creditor and the Company a notice containing the number and designation of the Onshore Retention Account and each sub-account thereof maintained by the Onshore Trustee and each DPC Rupee Account maintained by the Company and held by the Onshore Trustee under this Onshore TRA.

Section 2.4 No Waiver.

Section 2.4 No Waiver.

No certificate or notice delivered pursuant to this Onshore TRA shall be held to establish, or to estop any Secured Party from asserting, the existence or non-existence of any set of facts or to waive the right of any Secured Party to require the existence or non-existence of any set of facts.

Fig. 16

DEVICE SYSTEM AND METHOD FOR DETERMINING DOCUMENT SIMILARITIES AND DIFFERENCES

BACKGROUND OF INVENTION

This disclosure relates to the field of computer document processing, and particularly to enhancing the ability of a computer user to compare two or more documents and quickly understand the similarities and differences between or among these documents.

There are many circumstances in today's electronic world where it is desirable to compare two or more documents with one another. Writers of all stripes frequently wish to compare one version of a document with another version of a document, to see what similarities and changes exist as between two different versions of the same document. Legal professionals often need to compare different documents to see how they differ, whether these be, for example, draft contract proposals from two or more parties, or two different patents or patent applications. Lawmakers similarly need to compare various competing proposals for legislation, and to pinpoint what is different and what is the same between or among two or more often extremely lengthy and unwieldy proposals. A copyright attorney may be in the position of comparing two written works, to see if one has "copied" the other sufficiently to constitute an infringement. And, in a myriad of other situations, the need to compare documents and quickly pinpoint their similarities and differences, has grown to near ubiquity in today's electronic world. It is important to understand that this goes beyond and is independent of merely managing different versions of the same document. This encompasses the situation in which it is simply necessary to compare two documents—whatever their origins—for differences and similarities. Editing the document may also be done after or in conjunction with this comparison, by one person or by a group of people, but in many situations, the comparison may be the end result in and of itself.

Perhaps the most familiar method used to compare documents is the so-called "underline strikeout" method, such as is employed in the widely-used Microsoft® Word program. In this method, a first document is compared to a second document, and those words or phrases that are deleted in going from the first document to the second document are highlighted with a "strikeout" indicator on a computerized output device, while those that are added from the first to the second document are highlighted with an "underline" indicator on the output device.

This approach has many drawbacks, some of which will be described here. First, the two documents are not separately presented, but are merged into a single document rather than in distinct, juxtaposed windows. Thus, the user viewing the output presentation can often become confused about what was in the first document versus the second document. Also, the comparison method itself is generally serial, front-to-back, which makes it difficult for the user to identify when text has simply been moved from one place to another. Frequently, if a segment of text is moved, it will appear as a strikeout (deletion) from the first document, and an underline (addition) to the second document at an entirely different location. This gives the user no clue that this segment was actually moved, or where it was moved from and to. Further, for a structured document with multiple headings as well as a hierarchical header structure, the structural meaning of the headings is ignored, and these document headers are treated just like any other items of text. The entire document is outputted en-masse, and the user has no way to start from a header-based "table of contents" and simply "drill down" into the document sections that are of most interest for comparison. There are no suitable statistical or similar comparison summaries of similarities and differences, either for the whole document, or for various document substructures, to aid the user in navigating over to the subsections of greatest interest. Additionally, there is no context information outputted in conjunction with the document text to enable the user to immediately determine where the outputted text fits in the context of the overall document structure. Finally, individual subsections are not in any way "mapped" to one another before comparison, so that in deciding what to underline and what to strikeout, the computer processor's determination that something in the first document is "different" than something in the second document may be erroneous, because it is not comparing the right document subsections with one another following an appropriate subsection mapping.

A moderate enhancement to traditional underline strikeout methods is achieved by Workshare® in its DeltaView® document comparison software. Most significantly, if a segment of text is moved, it is identified as such, rather than simply as a deletion from the first document and an addition to the second document in some unrelated and not-indicated location. In particular, the move is still identified as a deletion from the first document and an addition to the second document, but is given a highlighting different from highlighting given to an ordinary deletion and addition, so as to specifically identify it as a move. This is still problematic, however, since it does not link the old location of the moved material in the first document to its new location in the second document. If there are multiple items of text that are moved or if the documents are long documents and the text is moved far from its original location, the benefit of this feature is lost since the moves will simply get lost amidst one another or the user will have to scroll through a large segment of text to find where the original text was moved to. At most, this is a move-enhanced form of underline strikeout, which otherwise diverges very little from conventional underline strikeout.

In addition to a window outputting the above-discussed enhanced underline/strikeout information, DeltaView® also has two further windows, one showing the first document, and the other showing the second document. However, these two windows show these two documents in clean, unmarked form, and do not in any way highlight changes as between the first and second documents. All information about the changes must be gleaned from the third, enhanced underline/strikeout window. It would be preferable, and would present a much simpler and easier to use output, if the enhanced underline/strikeout window were to be omitted, and if all of the highlighting information summarizing similarities and differences between the two documents were to be presented in only two windows, one for the first document, and one for the second, rather than in the three windows required for the DeltaView® presentation.

Finally, as with Microsoft® Word and similar software, DeltaView® entirely ignores the document structure, and document headers are treated just like any other items of text. As a result, the entire document is again outputted en-masse, and the user has no way to start from a header-based "table of contents" and simply "drill down" into the sections of the documents that are of most interest for comparison, aided by suitable statistical or similar comparison summaries of similarities and differences, either for the whole document, or in association with various document substructures. Additionally, there is no context information outputted in conjunction with the document text that would enable the user to immediately determine where the outputted text fits in the context of the overall document structure. Finally, individual subsections are not in any way "mapped" to one another before comparison, so that in deciding what to underline and what to strikeout, the computer processor's determination that something in the first document is "different" than something in the second document may be erroneous, because it is not comparing the right document subsections with one another following an appropriate subsection mapping.

Microsoft® WinDiff outputs a document comparison that is almost unintelligible to a novice computer user. As with the underline/strikeout method, the two documents are not separately presented, but are merged into a single document rather than in distinct, juxtaposed windows. But the comparison is even more unwieldy than an underline/strikeout comparison, and if a single word differs, it regards the entire line as differing. WinDiff requires the use of an additional window that awkwardly shows a visual output of parallel, interconnected lines representing a map of each document on a line-by-line basis, based on a three-color highlighting scheme indicating first document text not in the second document, second document text not in the first document, and text in both documents. Connecting lines are used to connect text that appears in both documents, including moved text, as between the individual document maps. The whole approach is awkward and non-intuitive at best. WinDiff also ignores the document structure, and document headers are treated just like any other items of text. Thus, WinDiff contains all of the other deficiencies earlier noted with respect to Microsoft® Word and Workshare® DeltaView® that relate to this ignoring of the document structure.

Norton Utilities® File Compare represents something of an improvement over Microsoft® Word and Workshare® DeltaView®, because it entirely foregoes the underline strikeout methodology wherein two documents are merged into a single document for output with underlines and strikeouts, in favor of a side-by-side output of the two documents being compared. In contrast to DeltaView®, this does contain highlighting information summarizing the differences between the documents. That is, Norton Utilities® File Compare does omit the third window required by DeltaView®. However, Norton Utilities® File Compare still has a number of drawbacks.

First, the highlighting of similarities and differences do not occur at a word-by-word level, but appears to occur on a line-by-line or a segment-by-segment basis, and so tend to greatly overstate the degree of difference between the documents, and to greatly understate the degree of similarity between the documents. If perhaps two or three words in a ten or twelve word segment of text have been altered, Norton Utilities® File Compare will highlight the entire ten or twelve word segment as having been altered.

Further, Norton Utilities® File Compare, like DeltaView®, does distinguish text moves from additions and deletions. However, it does not actually move the output of text in the second document to match the sequencing of the text in the first document, nor does it allow for any form of active highlighting wherein the use can simply designate text in one document and find out where that same text exists in the other document. Instead, in the first document output, it inserts the phrase "moved from line x" opposite the pertinent second document text, where x is the line number in the first document where that same text originates. Similarly, in the second document output, it inserts the phrase "moved to line y" opposite the pertinent first document text, where y is the line number in the second document to which that text has been moved. An actual move of the second document text to juxtapose with the first document text perhaps with some indication of where the moved text originated or of the fact that the text was moved and/or some form of active highlighting, would actually render the understanding of the text move less confusing.

Finally, Norton Utilities® File Compare, like Microsoft® Word, Microsoft® WinDiff, and Workshare® DeltaView®, also entirely ignores the document structure, and document headers are treated just like any other items of text. Thus, Norton Utilities® File Compare contains all of the other deficiencies earlier noted with respect to Microsoft® Word, Microsoft® WinDiff, and Workshare® DeltaView® that relate to this ignoring of the document structure. The entire document is again outputted en-masse, and the user has no way to start from a header-based "table of contents," and to simply "drill down" into the sections of the documents that are of most interest for comparison, aided by suitable statistical or similar comparison summaries of similarities and differences, either for the whole document, or in association with various document substructures. There is again no context information outputted in conjunction with the document text that would enable the user to immediately determine where the outputted text fits in the context of the overall document structure. And again, individual subsections are not in any way "mapped" to one another before comparison, so that in deciding what to mark as similar and different, the computer processor's determination that something in the first document is "different" than something in the second document may be erroneous, because it is not comparing the right document subsections with one another following an appropriate subsection mapping.

SUMMARY OF INVENTION

Disclosed herein is a device, system and method of outputting information to compare at least two documents, namely, at least a first document and a second document, to facilitate visual mapping and comparison of these documents. These documents comprise document subsections and the subsections comprise document subsection headers associated therewith. At least one of the first document subsection headers is juxtaposed relative to an output of second document subsection headers mapping thereto, to visually emphasize a header mapping. This header mapping is established by: mapping the first document subsections relative to the second document subsections based on identifying substantial similarities therebetween, to establish a subsection mapping therebetween; and, in relation to the subsection mapping and the association between the document subsections and the subsection headers, further mapping the first document subsection headers relative to the second document subsection headers.

Also disclosed is a related device, system and method of outputting information to compare at least two documents, namely a first document and a second document, to facilitate visual mapping and comparison of the documents. At least one subsection of the first document is juxtaposed relative to an output of a corresponding at least one subsection of the second document to visually emphasize a comparison therebetween. Differences established on a word-by-word basis between the outputted first and second document subsections are highlighted with difference highlighting, and similarities established on a word-by-word basis between the outputted first and second document subsections are highlighted with similarity highlighting different from the difference highlighting.

Also disclosed is a related device, system and method of outputting information to compare subsections within a document. A plurality of subsections of the document are outputted. At least two selected ones of the document subsections are juxtaposed relative to one another, to visually emphasize correspondences therebetween, in response to comparison selecting the selected document subsections for comparison with one another. Differences identified among the selected document subsections are highlighted with difference highlighting, and similarities identified among the selected document subsections are highlighted with similarity highlighting different from the difference highlighting.

Also disclosed is a related device, system and method of establishing a mapping to compare at least two documents, namely, at least a first document and a second document. These documents comprise document subsections and the subsections comprise document subsection headers associated therewith. The first document subsections are mapped relative to the second document subsections based on identifying substantial similarities therebetween, to establish a subsection mapping therebetween.

Also disclosed is a related device, system and method of highlighting similar text segments. A first selected text segment is similarity highlighted on a computerized output device in response to selecting the first selected text segment using a computerized input device. Simultaneously, at least one other text segment similar to the first selected segment is also similarity highlighted in response to said selecting the first selected text segment.

BRIEF DESCRIPTION OF DRAWINGS

The features of the invention believed to be novel are set forth in the appended claims. The invention, however, together with further objects and advantages thereof, may best be understood by reference to the following description taken in conjunction with the accompanying drawing in which:

FIGS. 1 and 2 respectively illustrates the text of a sample first document and a sample second document. This disclosure uses a comparison of these sample documents as the basis for illustrating the Device, System and Method for Determining Document Similarities and Differences disclosed herein.

FIG. 9 is sample screen output illustrating the further expansion of the hierarchical structural mapping of FIG. 8.

FIG. 10 is a sample screen output illustrating the comparison of a text section of the first document to a text section of the second document mapped thereto, following selection of those text sections by a computer user.

FIG. 11 is a sample screen output illustrating the active highlighting of a selected similarity between the document subsections of FIG. 10.

FIG. 12 is a sample screen output illustrating a substitution list generated from the comparison outputted in FIG. 10.

FIG. 15 is a screen shot taken from a prototype reduction to practice of the invention, showing the "mapped" (table of contents) view of FIGS. 3-9 for a complex legal document with a great deal of substructure.

FIG. 16 is a screen shot of taken from the sa me prototype reduction to practice of FIG. 15, showing the comparison view of FIGS. 10, 11 and 13 for this more complex legal document.

DETAILED DESCRIPTION

Figure 3:
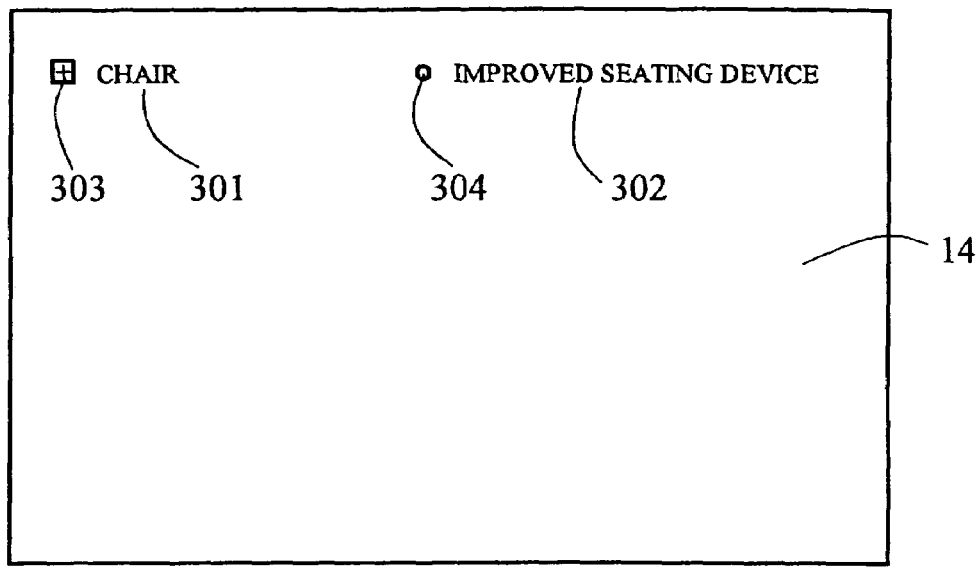
FIG. 3 is a sample screen output illustrating an output of the sample first and second document headers in a fully collapsed (unexpanded) state, in which the first document is dominant and the second document is subservient.

To more fully illustrate the invention, FIGS. 1 and 2 display two somewhat-differing versions of a document which are to be compared using the invention disclosed herein. These sample documents in FIGS. 1 and 2 are hypothetical patent documents describing and claiming a "chair." While the device described in these documents certainly is not novel in light of current- day art, the documents themselves provide a good illustration of the various features of the document mapping and comparison and related functionality that comprises the invention disclosed herein.

We will begin by discussing the differences and similarities between these two documents in detail. Then, we shall illustrate how these differences and similarities can be quickly and easily pinpointed according to the invention disclosed herein.

The two illustrative documents of FIGS. 1 and 2 are structured documents, which is to say that there is a definitive structure associated with these documents. Some of this structure is explicit in the form of various subsection headers that are part of the documents themselves. Some of this structure is implicit and is thus derived from the document itself, such as the tree structure inherent in a series of patent claims that are dependent one from the other. As will be discussed at length herein, some of the implicit structure is coerced into the documents through the actual comparison of the documents themselves.

These two illustrative documents are purposefully designed to have certain similarities as well as certain differences, since it is a key object of the invention to allow a user of this invention to look at a computerized output device such as a computer screen and quickly navigate through the documents and engage in a visual comparison of the documents to rapidly pinpoint the differences and similarities between the documents, as well as how extensive such differences and similarities are.

Structurally, it is to be noted that the headers are somewhat different between the "first document" 1 shown in FIG. 1 and the "second document" 2 shown in FIG. 2. The title of first document 1 is "CHAIR," while that of second document 2 is "IMPROVED SEATING DEVICE." In first document 1, the first subsection 101, in its header 102, is explicitly titled "Background of the invention," while in second document 2, the first subsection 201 is explicitly titled, in its header 202, simply, "Background." For these first subsections 101 and 201, including subsection headers 102 and 202, there are a total of five document segment differences between these subsections, encompassing eight words in first document i that are not in second document 2 and 11 words in second document 2 that are not in first document 1. These five document segment differences are as follows: First, as noted, the segment "of the invention" is deleted from the subsection title going from first document 1 to second document 2. Second, the segment "need" in first document 1 is replaced in second document 2 by the segment "become tired and would like." Third, the segment "Beds enable" from first document 1 is replaced by "A bed enables" in second document 2. Fourth, the segment "to" is added to second document 2 between the words "not" and "sit." Fifth, the segment "a halfway" in first document 1 is replaced by the segment "an intermediate" in second document 2. Although literally different, the segment "Beds enable" is similar to the segment "A bed enables" aside from one being in a singular and the other in a plural form. Thus, by a suitable use of "stemming" techniques, these segments may in fact be regarded as similar, not different, for purposes of mapping these documents to one another. This is the first of several cases to be discussed where a literal difference in one respect may in fact be regarded as a similarity in a different respect.

Including the headers 102 and 202 of these first subsections 101 and 201, there are also a total of six document segment similarities between these subsections, encompassing a total of 44 identical words that appear in these first subsections in both first document 1 and second document 2. Thus, if one tallies up the differences and similarities between the first subsections 101 and 201 including headers 102 and 202, of first 1 and second 2 documents, for example, by counting words, there are a total of 19=11+8 differences, and 88=44+44 similarities. Hence by this "word counting" similarity measure (which is but one example of how to measure this), these subsections sections are 88/(88+19)=88/107=82.2% similar. This similarity measure is even higher if stemming is employed to find a match between "Beds enable" and "A bed enables."

It is important to note, however, that it is not a foregone conclusion at the outset that the first subsection of first document 1 will map to the first subsection of second document 2. For example, the second subsection 103 of first document 1 has a subsection header 104 titled "Objects of the invention," while the second subsection 203 of second document 2 has a subsection header 204 titled "Figure." Not only are these subsection headers different, but the content of these subsections is also entirely different. In first document 1, the body of the second subsection reads "It is therefore an object of the invention to provide a device for a person to sit in an intermediate position between standing, and lying down or sitting on a rug," while in second document 2, the body of the second subsection reads "FIG. 1 shows a chair according to the preferred embodiment of the invention."

An ordinary "underline-strikeout" program encountering this difference would simple conclude that "Objects of the invention/It is therefore and object of the invention to provide a device for a person to sit in an intermediate position between standing, and lying down or sitting on a rug" was replaced with "Figure/FIG. 1 shows a chair according to the preferred embodiment of the invention," and would strikeout the former and underline the latter. However, what has really happened here is that the subsections of the two documents are somewhat out of sequence relative to one another. (The "/" is used to separate the subsection header from the subsection text.)

Particularly, in first document 1, the body of second section 103 reads "It is therefore an object of the invention to provide a device for a person to sit in an intermediate position between standing, and lying down or sitting on a rug." In second document 2, the phrase "person to sit in an intermediate position between standing, and lying down or sitting on a rug" also appears. But it is in a separate sentence at the end of the third subsection 205 with the explicit header 206 titled "Summary," and does not have its own explicit header. It is important to highlight this information to the user. Conversely, second subsection 203 comprising the sentence "FIG. 1 shows a chair according to the preferred embodiment of the invention" appears absolutely verbatim in both first document 1 and second document 2, but in first document 1, it is in the fourth section 105 under the fourth section header 106 "Drawings," while in second document 2, it is in second section 203 under the second header 204 "Figure." It is important to also highlight this information to the user.

In terms of similarities and differences, the second subsection 103 of first document 1 has absolutely no similarity with and is completely different from the second subsection 203 of second document 2. However, it does map quite well to the sentence at the ends of the third subsection 205 titled "Summary" in second document 2. In particular, The segment "It is therefore an object of the invention to provide a device for" (13 words) is deleted in going from document 1 to document 2, but the remaining segment "a person to sit in an intermediate position between standing, and lying down or sitting on a rug" (18 words) it left fully intact without change. Further, it is the fourth subsection 105 of first document 1, explicitly entitled with the fourth section header 106 "Drawings," that maps with complete similarity and no difference to the second subsection 203 of second document 2, with the second section header 204 explicitly entitled "Figure." If one tallies the word similarities and differences between "Drawings/FIG. 1 shows a chair according to the preferred embodiment of the invention" from the fourth subsection 105/106 of first document 1 with "Figure/FIG. 1 shows a chair according to the preferred embodiment of the invention" from the second section 203/204 of second document 2, the word "Drawings" is deleted from first document 1 and replaced by the word "Figure" in second document 2, (2 differences) while all 13 words of the subsections themselves (105 and 203) remain unchanged (26 similarities). This, by the similarity measure earlier discussed, these are 26/28=92.9% similar and ought to be mapped together with one another.

FIG. 3 shows a top level contracted (unexpanded) structural comparison of first document 1 with second document 2. All that is outputted on computerized output device 14 is the title 301 of first document 1 juxtaposed horizontally to the left of the title 302 of second document 2, and a "+" expansion button 303 (or similar expansion means) that a user can select with a computerized input device, for example, by pointing and clicking a mouse, in order to expand this output down to the next hierarchical level.

Figure 4:
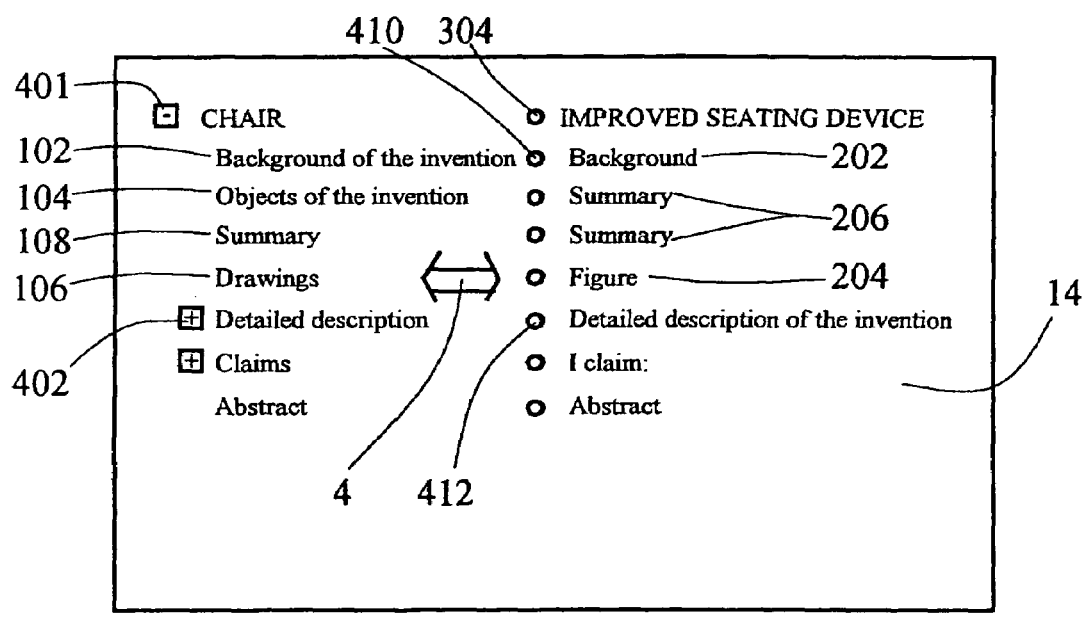
FIG. 4 is a sample screen output illustrating a first level hierarchical structural mapping of the two sample documents to one another.

By clicking the "+" expansion button 303 in FIG. 3, the user arrives at a first level hierarchical structural mapping of the two documents to one another as shown in FIG. 4. This click on expansion button 303 simultaneously expands the output of both the first document subsection headers 12 and the second document subsection headers 13. Were one to click on the "−" contraction button 401 to the left of "CHAIR," this output would contract the first and second document header outputs simultaneously, back to the outputs of FIG. 3. This type of expansion and contraction is widely practiced in the prior art for a single structure, i.e., for a tree of directories on a computer or for a single structured document. But the simultaneous expansion and contraction of two parallel structures being compared to one another does not appear to be disclosed or suggested in the prior art.

Referring now to FIG. 4, it is first to be noted that the user, in making the document comparison, needs to select one of the two documents as the "dominant" document, and the other as the "subservient" document. In FIG. 4, first document 1 has been selected to be dominant, and second document 2 has been selected to be subservient. This is needed because, to the extent that the documents are out of sequence with one another (or have different structures, to be discussed shortly), the dominant document is used to establish the sequence (and structure) for output, while the output of the subservient document is resequenced (and restructured) to match the output of the dominant document. That is, the outputs of the first document subsection headers 102, 104, 106 etc. are juxtaposed relative to the outputs of the second document subsection headers 202, 204, 206 etc. to visually emphasize the mapping 4 between these subsection headers, in particular, by resequencing (and restructuring) the subservient document to match the original sequence (and structure) of the dominant document.

Let us examine how this addresses the resequencing discussed earlier. In FIG. 4, the output of the first document subsection header "Background of the invention" (102) is juxtaposed horizontally with the output of the second document header "Background" (202). This is based on the determination made earlier that these sections match up with a high degree of similarity (82.2% using the similarity measure discussed above), or a similar type of determination that would be apparent to someone of ordinary skill and which is considered to fall within the scope of this disclosure and its associated claims. No resequencing needs to occur for these subsections.

However, it is now to be observed that the output of the first document subsection header "Objects of the invention" (104) has juxtaposed to its right, an output of the second document subsection header "Summary" (206). This tells the user that whatever text material appears in the subsection body (103) under the header "Objects of the invention" (104) in first document 1 maps most closely to the text material that appears under the header "Summary" (06) in second document 2, even though these are out of sequence in the original documents 1 and 2. In particular, this has occurred because prior to outputting the header juxtapositions in FIG. 4, the underlying computerized system has already performed a mapping of the first document subsections 101, 103, 105 and other sections not expressly given a reference number, relative to the second document subsections 201, 203, 205 and other sections also not expressly given a reference number, to determine which headers 102, 104, 106, and others without reference numbers in first document 1 relate most closely to which headers 202, 204, 206 and others without reference numbers in second document 2. Then, the output of the first document subsection headers 102, 104, 106 etc. in juxtaposition to the second document subsection headers 202, 204, 206 etc. occurs such that the second document subsection headers 202, 204, 206 etc. are resequenced and restructured prior to output, irrespective of their original sequencing, and irrespective of their original structuring. In different terminology, the sequence and structure of the subservient document is "coerced" to take on the sequence and structure of the dominant document. During this mapping, the computerized system ascertained a high degree of similarity between the header/subsection 104/103 of first document 1 and header/subsection 206/205 of second document 2 based on the identical phrase "person to sit in an intermediate position between standing, and lying down or sitting on a rug" appearing in both documents, as discussed earlier. As a consequence, the computerized system causes the "Objects of the invention" header 104 of first (dominant) document 1 next to be outputted to the "Summary" header 206 of second document 2, by upwardly resequencing the "Summary" header 206 of the second (subservient) document in the FIG. 4 output.

Note that for second document 2, in addition to resequencing, a form of restructuring has also taken place, and an implicit header has been added. In particular, the sentence "It is therefore an object of the invention to provide a device for a person to sit in an intermediate position between standing, and lying down or sitting on a rug" in first document 1 was structured under its own heading, namely "Objects of the invention" (104). However, the sentence "This enables a person to sit in an intermediate position between standing, and lying down or sitting on a rug" in second document 2 did not have its own heading, but was a second paragraph under the "Summary" header 206. Because first document 1 has been chosen by the user to dominate the structure, the sentence "This enables a person to sit in an intermediate position between standing, and lying down or sitting on a rug" in second document 2 is coerced to take on a header to match the first document 1 structure (the structure of the subservient document is coerced to that of the dominant document), and this header is implicitly drawn from the "Summary" header 206 under which this sentence falls in second document 2.

In FIG. 4, there is next a juxtaposition of the first document header "Summary" (02) astride a replication of the second document header "Summary" (206). This is because the computerized system has mapped the full paragraph 107 under the "Summary" header 108 in first document 1 to the first full paragraph under "Summary" header 206 in second document 2, and has determined that these are highly similar. The differences are that the word "posterior" in first document 1 is replaced by the word "buttocks" in second document 2 (2 words), and that second document 2 has added the new sentence "Optional arm rests provide a locale for the user to rest his or her arms." (15 words) But the similarities are in a total of 53 words in two segments that are identical from one document to the other, yielding in the exemplary counting method used earlier 106 similarities and 17 differences, or a 106/123=86.2% similarity. (Incidentally, the similarity measures can be and preferably are more complex than just the simplified word counting used for illustration here. For instance, the fact that the 53 matching words occur in only two segments further strengthens the match, as opposed to, for example, if these 53 words were to be randomly scrambled into a large number of segments.) If a thesaurus (or some means of detecting synonyms) is during this mapping of the two documents, then the word "posterior" is considered similar to, not different from, "buttocks," and the similarity measure is enhanced even further, especially since the two segments separated by "posterior" and "buttocks" can be considered as a single segment with no differences. This is another instance in which a literal difference in one respect may in fact be regarded as a similarity in a different respect. (Note that the use of "segment" is considered to cover a document region spanning one or more words or punctuation marks:)

Next we come to the first document header "Drawings" 106 which is juxtaposed to the second document header "Figure" 204. Without a thesaurus showing synonyms, the underlying computerized system would have no way of knowing that these two headers should be mapped together. But, by mapping the text subsections 105 and 203 under these respective headers, and ascertaining that each of these headers is associated with the identical text "FIG. 1 shows a chair according to the preferred embodiment of the invention," the computerized system deduces that the header "Figure" 204 in the subservient document maps to the header "Drawings" 106 in the dominant document, and coerces a downward resequencing of the header "Figure" 204 from the subservient document to match the original sequence of the dominant document. With a thesaurus to match "Drawings" with "Figure," these section are mapped to one another with 100% similarity. Even without the thesaurus, and even if "Drawings" is regarded as different from "Figure," the mapping of 4 words per document is 13 similar words per document and 1 different word per document (26/28=92.9%) if the headers are considered in the mapping, and 100%=26/26 of the headings are discarded and the mapping is based only on the subsection text and not the associated headers. In all events, the similarity detected by the mapping is significant enough to coerce the "Figure" header 204 in the subservient document down to the "Drawings" header 106 in the dominant document.

Figure 5:
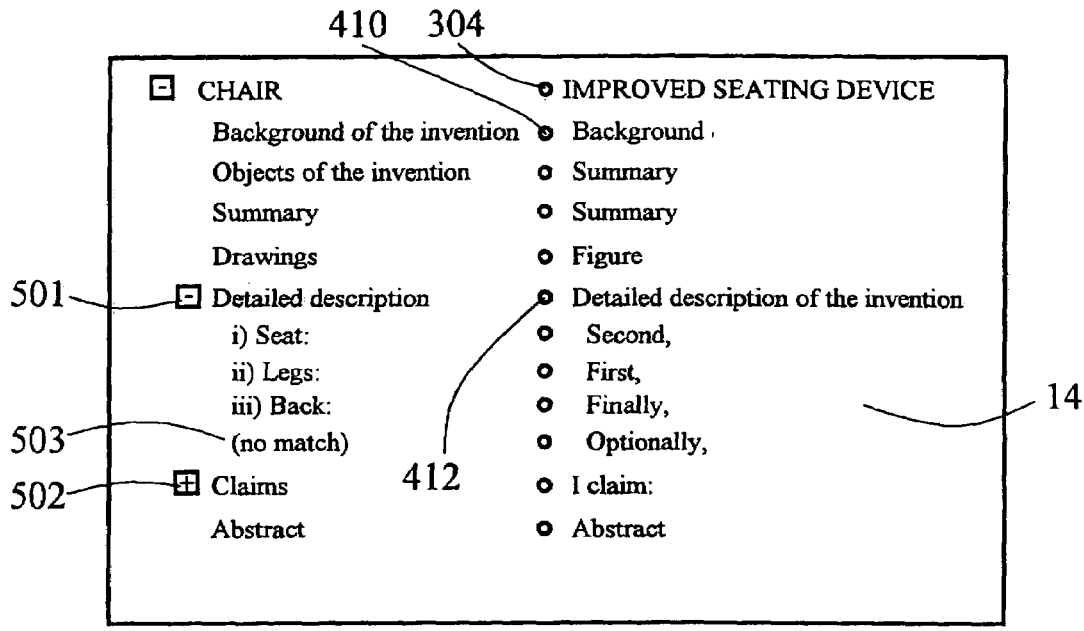
FIGS. 5 and 6 are sample screen outputs illustrating the further expansion of the hierarchical structural mapping of the two sample documents to one another.

If the user at this juncture decides to use the computerized input device, e.g., mouse to select the "+" expansion button 402 next to the heading "Detailed description," the output expands from that of FIG. 4 to FIG. 5. Again, the heading outputs of both documents expand simultaneously in response to this single selection. By virtue of the numbering i), ii) and iii) and/or underlining in the "Detailed description" subsection of first document 1, the computerized system identifies the sentences associated with this numbering as defining a second-level hierarchical structure. (Of course, other identifiers apparent to someone of ordinary skill besides numbering or underlining can be used to identify subsections within the scope of this disclosure and its associated claims.) During the mapping to the "Detailed description of the invention" section of second document 2, the computerized system finds a high degree of similarity. However, in second document 2, there is no explicit substructure, and the ordering of the "seat" and "legs" discussion is reversed.

Because first document 1 dominates, the "Detailed description of the invention" in second document 2 is coerced to take on a structure parallel to that of first document 1, and it is also coerced into being resequenced to match the sequence of first document 1. Thus, the first word of each of the sentences from second document 2 are coerced into being implicit headers for these sections (one can find other ways to establish implicit headers; picking the first word, or a leading phrase, is just an example), and are also coerced into resequencing to match the first (dominant) document 1. Thus, as shown in FIG. 5, "i) Seat:" is juxtaposed to "Second;" "ii) Legs" is juxtaposed to "First;" "iii) Back:" is juxtaposed to "Finally."

It will now be observed that in second document 2, a new feature is added to the chair, namely, an armrest. This is described in the final sentence of the detailed description that begins with "Optionally," and is coerced into being yet another subsection of second document 2 in order to match with the first document structure. However, there is no counterpart to this section in first document 1. Because this second document subsection is determined to have no mapping with any first document subsection, a null subsection header 503 is coerced into first document 1 (that is, first document 1 is "self-coerced" to take on an extended structure to add a fourth "null" heading to extend the structure it established with the i), ii) and iii) numbering), and is juxtaposed in the output against the second document subsection 41 for which this no mapping is determined. The null header 503 "(no match)" is outputted for example here, but any of a limitless variety of phrases or outputs (or even a blank space) can be used to indicate such a null correspondence.

Now, let us suppose that starting from the output in FIG. 5, the user selects the "−" contraction button 501 next to "Detailed description" to cause a simultaneous contraction of each document, and then selects the "+" expansion button 502 next to claims. Then, the user selects any further expansion buttons showing up under the claims to fully expand all of the claims. The resultant output will then be that of FIG. 6. While there are minor differences, it is clear that claims 1 and 2 in each document are sufficiently similar such that they will map to one another, but that claims 3 and 4 in second document 2 have no counterpart in first document 1.

Figure 6:
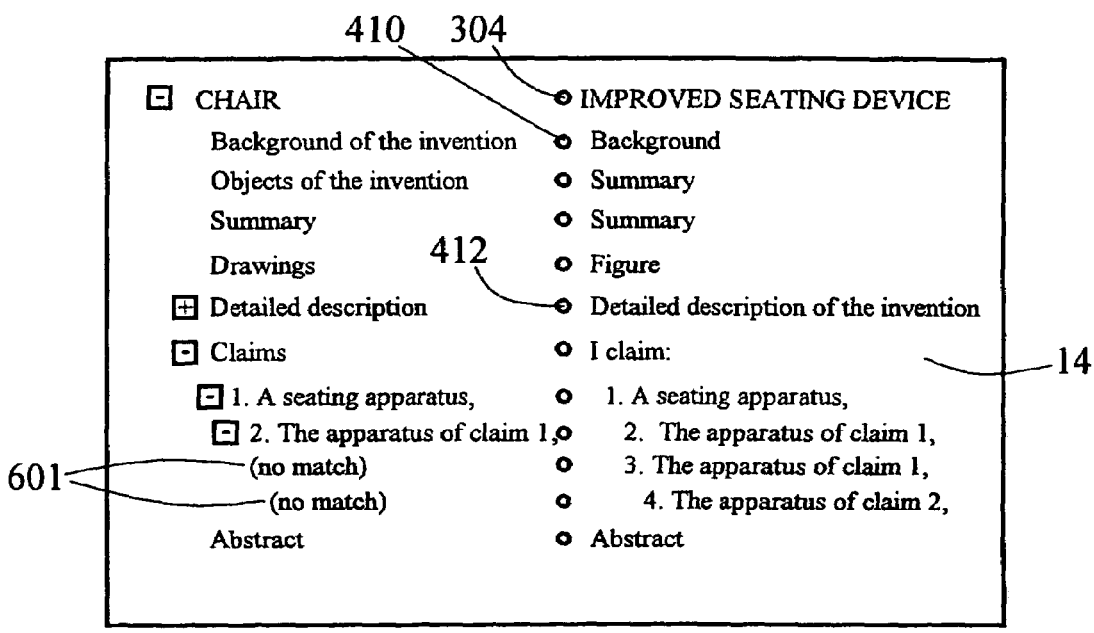

In this case, the claim numbers, as well as the leading text in each claim, are used to define the subsection headers outputted in FIG. 6. However, without some understanding of claiming, each claim would be equally indented, and there would be no hierarchy associated with these claims based solely on their headers. First document 1 is "self-coerced" to extend the structure established by its claims 1 and 2, thus providing a null mapping 601 to claims 3 and 4 of second document 2.

However, if the invention disclosed herein is to be used with certain specialized types of documents that have certain specialized structures, such as but not limited to patent documents, then the programming that drives the underlying computerized system can be implemented to recognize certain aspects of these documents besides their explicit headers, in order to derive a structure for these documents. Thus, for patent claims, since claims 2 and 3 are dependent on claim 1, they are one level down in the structural hierarchy from claim 1, and since claim 4 depends on claim 2, it is one level down in the structural hierarchy from claim 2. Methods for deducing this structure from the claim text should be obvious to someone of ordinary programming skill.

They key point is that the determination of document structure derives explicitly and/or implicitly from various factors. Of course, an explicit header in front of a subsection provides explicit structure, especially if it is numbered/lettered in accordance with a "table of contents" schema that implies a certain hierarchical structure, or if the documents comprise an expressly-represented table of contents. But, the structure can be implicitly derived in a wide variety of ways apparent to someone of ordinary skill within the scope of this disclosure and its associated claims, based on some understanding of the particular types of documents that are intended to be compared.

Figure 7:
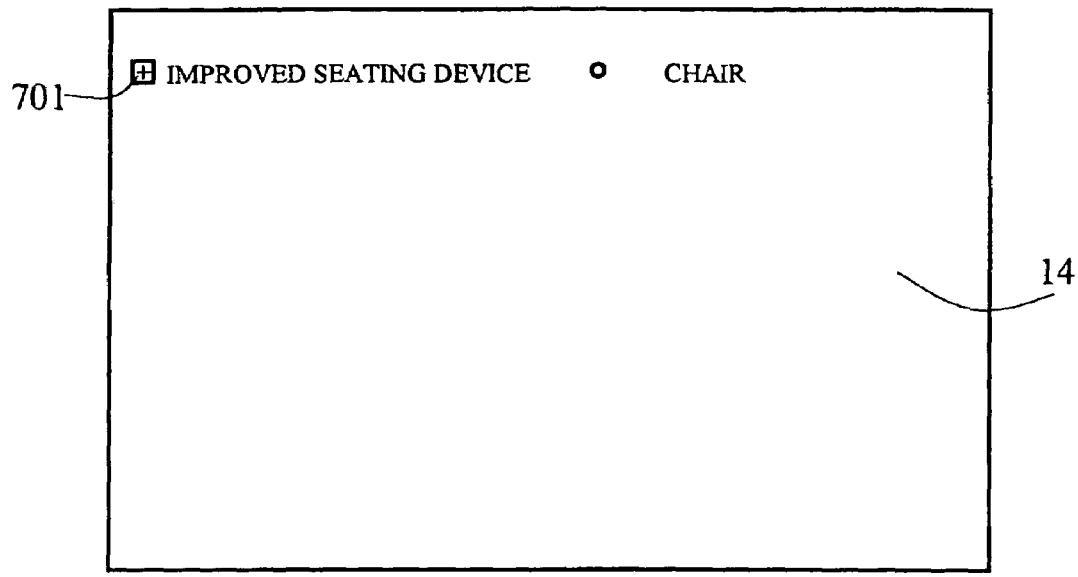
FIG. 7 is a fully collapsed sample screen output similar to FIG. 3, but in which the second document is now dominant and the first document is now subservient.

In the foregoing discussion, first document 1 was selected by the user to be dominant, and second document 2 was selected by the user to be subservient. FIG. 7 now begins to illustrate the reversed situation, in which second document 2 is selected at the dominant document and first document 1 is selected to be subservient. Thus, in FIG. 7, the title of second document 2 is outputted on the left and that of first document 1 s outputted on the right. There are of course many ways obvious to someone of ordinary skill in which this selection of which document is dominant can occur, and how this selection is made in detail is much less pertinent than the fact that this selection can be made. In one such method, for example, the user might have outputted a list of documents, and would first point and click on the document which is to be dominant, and would second point and click on the document which is to be subservient. If three or more documents are to be compared, one is selected to be dominant, and all others are selected to be subservient and will thus be coerced to the dominant document.

Figure 8:
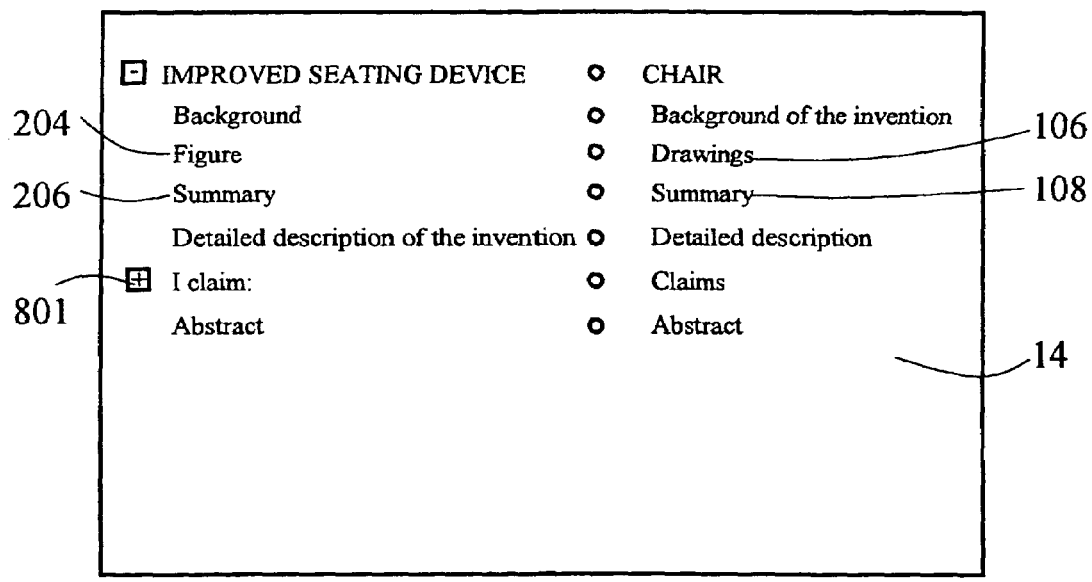
FIG. 8 is a sample screen output similar to FIG. 4 illustrating a first level hierarchical structural mapping of the two sample documents to one another, with the second sample document being dominant.

Starting from FIG. 7, a mouse point and click on the "+" expansion button 701 next to the titles again—simultaneously expands the output of the headers of the two documents which have been mapped to one another by the computerized system, as shown in FIG. 8. But here, second document 2 dominates the sequence and the structure. Hence, since the "Figure" heading 204 heads the second subsection of the dominant document, it is the second subsection header shown in the left-hand column, and the "Drawings" header 106, which is originally sequenced as the fourth section of the subservient document, is coerced to be resequenced up to the second header position in the right-hand column. "Summary" matches up to "Summary," but with one difference from the situation of FIGS. 3 through 6. Because second document 2 now dominates the structure, the fact that the sentence "It is therefore an object of the invention to provide a device for a person to sit in an intermediate position between standing, and lying down or sitting on a rug" has its own heading in the original structuring of the first (now subservient) document 1, its counterpart phrase "This enables a person to sit in an intermediate position between standing, and lying down or sitting on a rug" in the second (now dominant) document 2 does not have its own header, but is subsumed under the "Summary" header. Thus, since the original structure of second document 2 now dominates, the "Objects of the invention" header 104 is coerced entirely out of the output in FIG. 8, and does not appear anywhere.

Similarly, since "Detailed description of the invention" in the second (now dominant) document 2 does not contain the second-level subsections denoted by roman numerals i), ii) and iii) of first document 1, first document 1 is coerced to lose this second-level substructure, and all that is outputted is the header "Detailed description of the invention" juxtaposed to "Detailed description," but without any "+" expansion button leading to any further substructure.

The phrase "I claim": maps to "Claims," and the abstracts map to one another.

If the user now points and clicks on the "+" expansion button 801 next to "I claim:," and further clicks on all expansion buttons within the claims, the claims are fully expanded as shown in FIG. 9. Claims 1 and 2 map from one document to the other, while claims 3 and 4 of second document 2, which have no counterparts in first document 1, are outputted in juxtaposition to a null, e.g., "no match" header 901.

At this point, enough examples have been provided so that it becomes possible to talk about the invention in more general terms. In the broadest terms, there are two main processes that take place, namely, "mapping," followed by "comparison." We discuss this in further detail below.

First, "subsections" are identified for each document to be compared. Two (or possibly more) documents are mapped to one another to establish and output correspondences between their various identified subsections based on identifying substantial similarities between (or among) these document subsections. These correspondences are then outputted as already discussed in connection with FIGS. 3 through 9. If more than two documents are compared at a single time, the additional documents are juxtaposed just as in FIGS. 3 through 9, but with an additional column (or similar juxtaposition structure) for each of the third and subsequent documents. One of these documents is still selected as the dominant document for the purpose of coercing the sequencing and structure of the other documents.

For the simplest case of two documents, once these "subsections" of each document are suitably identified by the computerized system, all subsections of first document 1 is combinatorially compared against all subsections of second document 2, and a similarity measure (such as but not limited to the "word counting" similarity measure described earlier as an example of similarity measure) is established for each section of first document 1 in relation to every other section of second document 2. (For more than two documents, mapping is carried out for each document in reference to the dominant document.) Of course, the similarity measure will be close to zero for some section map combinations, and close to 1 (or, e.g., 100%) for other section map combinations. The strongest similarity measures establish the mapping. Preferably, as discussed earlier, a thesaurus is used to map synonyms to one another and stemming is used to map matching root words and phrases to one another, such that these are all regarded as similar, not different, for the purpose of this mapping. (Later on, when the subsections themselves are compared, these will be shown as differences.)

The results of this mapping are used to determine which subsections of second document 2 (and third, fourth, etc., if more than two document are compared) map most closely to which sections of first document 1. The documents other than the dominant document are then coerced into resequencing and restructuring based on how they map to the dominant document, and the document headers associated with the various document subsections are then outputted in the manner described in connection with FIGS. 3 through 9. For two document comparison, each pair of headers that is shown in juxtaposition on the output comprises a "header pair." For three documents, the mapped headers comprise header triplets, etc.

Figure 13:
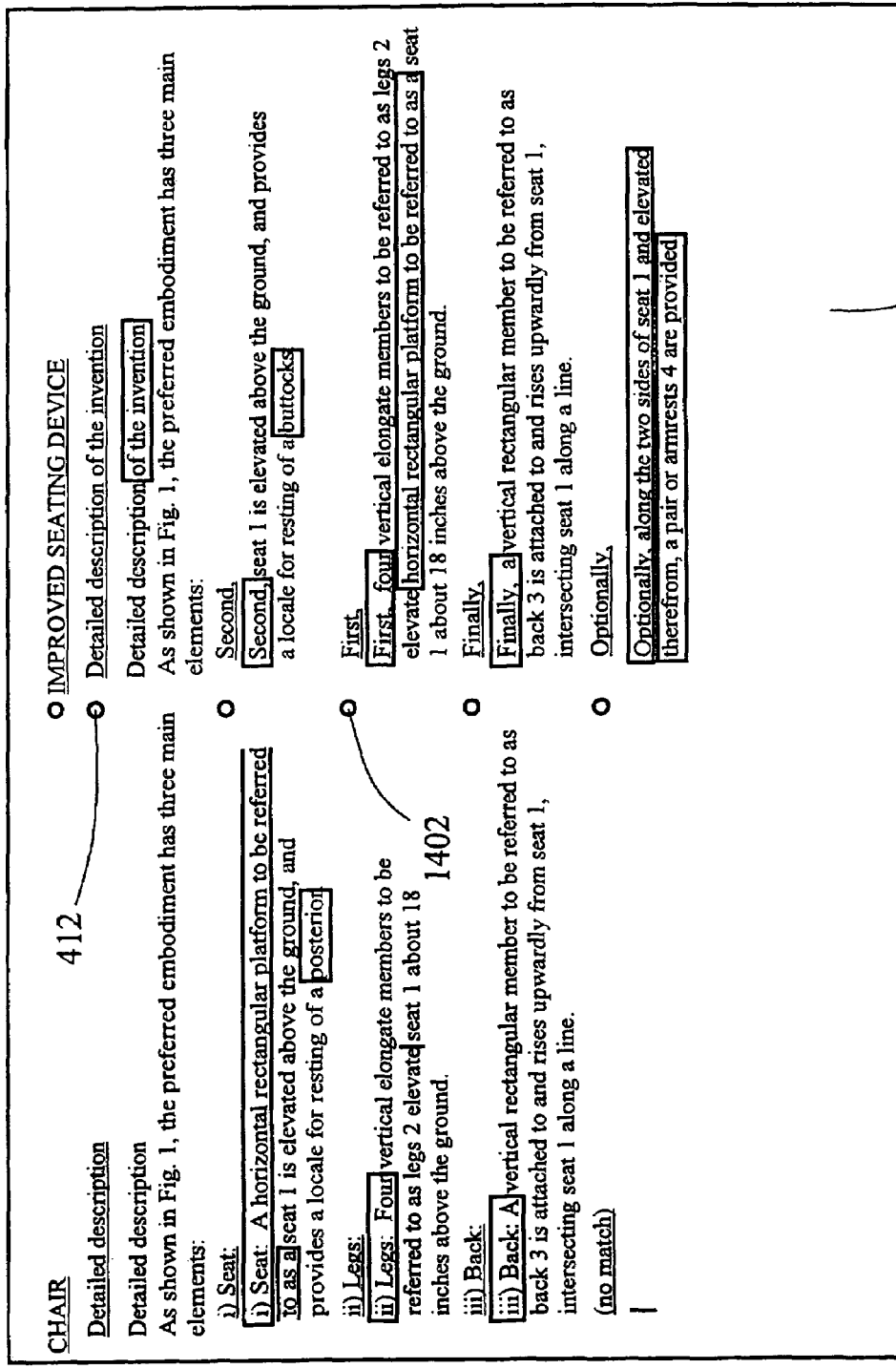
FIG. 13 is a sample screen output illustrating the comparison of the first document to the second document, similar to FIG. 10, but at the hierarchical level of a section that encompasses several subsections thereof.

Second, again for the simplest case of two documents, after the results of this mapping are outputted as in FIGS. 3 through 9, the user then has the ability to select one or more of the header pairs from these mapping outputs, and based on this selection, to simultaneously output first document 1 subsections and second document 2 subsections associated with this header pair selection, juxtaposed to visually emphasize the comparison of these subsections. FIGS. 10, 11 and 13 to be discussed shortly, are used to illustrate the comparison that occurs after the mapping is complete.

One will note the presence of a small circle in the middle of the two columns in FIGS. 3 through 9. This small circle (or similar device) provides a means for comparison selecting a particular header pair in order to output a detailed comparison of the subsections associated with the selected header pair.

For example, starting from any of the outputs of FIGS. 4, 5, or 6, and thus knowing that the computerized system has mapped first document subsection 101 titled with the header "Background of the invention" 102 to second document subsection 201 titled with the header "Background" 202, suppose the user would now like to see, in detail, how these two subsections 101 and 201 compare to one another. To obtain such a comparison, the user uses the computerized input device to select the header pair "Background of the invention" and "Background," for example, by pointing and clicking on the comparison selection means 410 (e.g., the small circle) between (or juxtaposed in some suitable configuration relative to) this header pair.

The result of this selection on comparison selection means 410 in any of FIGS. 4, 5, or 6 is shown in FIG. 10. In FIG. 10, the text of the selected subsection 101 of first document 1 (and optionally its header 102) is outputted in the left-hand column, and the text of the selected subsection 201 of second document 2 (and optionally its header 202) is juxtaposed relative thereto in the right hand column. This is a simultaneous output of the subsections from both the first and second document in response to a single point and click on the comparison selection means 410—associated with this subsection header pair. Optional subsection context information is also outputted toward the top of the screen, showing where this all fits in the context of the overall document structure. Let us examine this in more detail.

First, turning to the detailed text of the selected subsections 101 and 201, FIG. 10 shows difference highlighting—1002 in the form of rectangles (and vertical lines) that are drawn around (or proximate) each segment of text that differs from its counterpart in the other document. Thus, the segments discussed earlier that are different from one another are highlighted in this way. Thus, the difference highlighting of "need" in first document 1 and of "become tired and would like" in second document 2 visually emphasizes to the user, the fact that "need" is modified (replaced) by "become tired and would like" when moving from the first to second document 2. The difference highlighting of "Beds enable" and "A bed enables" visually emphasizes that "Beds enable" is replaced by "A bed enables" when moving from the first to second document 2. The optional "addition marker" e.g., a vertical line or similar device to the right of "not" in first document 1 and the difference highlighting of "to" in second document 2 visually emphasizes that there is something added to second document 2 at the location in first document 1 marked by the addition marker, and that that addition is the word "to" in the highlighted spot in second document 2. Finally, the difference highlighting shows the replacement of "a halfway" with "an intermediate" when moving from the first to the second document.

The comparison of "Beds enable" and "A bed enables" is of further interest because, as discussed earlier, during the mapping phase, these two phrases, using stemming, were regarded as equivalent. But, in the comparison stage, the differences in these phrases are illustrated and emphasized. That is to say, for the purpose of mapping together the two documents to determine which subsections map to one another and are this most appropriately compared, it is desirable to declare a "similarity" rather than a "difference" when one root phrase is simply replaced by a similar root phrase that is simply stemmed (differently e.g., truncated, re-tensed, pluralized or singularized, capitalized or lower-cased, differently punctuated) or when one word or phrase is replaced by a synonymous word or phrase, since this will facilitate more accurate mapping. Conversely, when comparing text to text as in FIG. 10, then it is desirable to highlight all differences, so that the user can easily determine that one root phrase has been replaced by a literally different, though semantically similar root phrase, (stemmed) or that one word or phrase has been replaced by a synonymous word or phrase.

Turning now to the headers 102 and 202 just above the subsections 101 and 201, the differences in the headers are also highlighted in exactly the same manner as differences in the subsections. Here, the optional "deletion marker" e.g., a vertical line or similar device to the right of "Background" in second document 2 coupled with the difference highlighting of the phrase "of the invention" in first document 1 visually emphasizes to the user that the phrase "of the invention" is deleted when moving from the first to the second document, and shows where it is removed from.

Also shown (in this case by its absence) is similarity highlighting different from the difference highlighting, showing which phrases are unchanged moving from first document 1 to second document 2. In this example, the fact that no highlighting at all appears on the similar phrases in FIG. 10 serves to advise the user that these phrases are unchanged. That is, in FIG. 10, only differences are highlighted, and unhighlighted text is regarded as similar (unchanged).

Note that although similarities and differences are illustrated for document segments, they are established on a—word-by-word basis. This is in contrast to comparing documents, e.g., line-by-line and determining that two lines are different from one another if any words in the line are different, which would grossly overstate differences and understate similarities.

Obvious variations in this difference/similarity highlighting scheme will be apparent to someone of ordinary skill, and it is to be understood that all such variations are considered to be within the scope of this disclosure and its associated claims. For example, in the implementation illustrated here, the similarities are in fact identified by their absence of highlighting, i.e., by their being outputted as ordinary text. Then, when the cursor is pointed over one of these similar document segments (even without a click) that segment, as well as its counterpart segment in the other document, will be additionally, expressly highlighted for similarity. Thus, as shown in FIG. 11, when the user moves the input device, e.g., cursor pointer 1101 controlled by a mouse over the segment "them to lie down, but not" in first document 1 (or alternatively, in second document 2), this segment receives additional similarity highlighting in the form of an underline (or any other suitable highlighting) that appears with respect to the appearance of this segment in both the first and second documents. That is, a single point simultaneously highlights similar phrases in both documents. In this manner, the user can effectively ask what phrase in second document 2 is identical to a selected (pointed to) phrase in first document 1 (or vice versa), by pointing to the phrase in first document 1 and having that phrase as well as its second document counterpart receive additional difference highlighting (or vice versa). This will be referred to herein as "active highlighting," since it is actively responsive to the use input device in the manner described.

More generally, any two (or more) text segments that are outputted on a computer output device can be actively highlighted in this way, even two text segments that are within a single document. A first selected text segment (e.g., the segment "them to lie down, but not" in the left hand column of FIG. 11) is similarity highlighted in response to selecting that first selected text segment using a computerized input device. Simultaneously, this causes other text segments similar to the first selected text segment (e.g., "them to lie down, but not" in the right hand column of FIG.

11) to also be similarity highlighted in response to selecting the first selected text segment using the computerized input device.

This active highlighting ("additional similarity highlighting") has very general utility in a wide range of situations. For example, if a first text reads "John gave Mary a kiss" and a second reads "Mary gave John a kiss," placing the cursor over the one-word segment "John" in either text highlights "John" in both texts. Placing the cursor over the one-word segment "gave" in either text highlights "gave" in both texts. Placing the cursor over the one-word segment "Mary" in either text highlights "Mary" in both texts. Finally, placing the cursor over the two-word segment "a kiss" highlights "a kiss" in both texts. As such, this provides a way for a user to ask where a particular word or phrase in the first document shows up in the second document. While "coercion," as discussed above, is used to display subsection moves, this active highlighting is one good way of ascertaining text moves within a subsection. If some text that is pointed to in a subsection of one document is located elsewhere (is moved relative thereto) in the same subsection of another document, the appearance of the active highlighting on the pertinent section the other document enables the user to clearly deduce that a move has been made, and to know exactly how that move has been made.

Suppose further, for example, that a user wants to see multiple occurrences of a text such as the term "Force Majeure" in a legal contract. By placing the cursor over this term in one place, the user can cause this term to be highlighted in all other places as well. It is to be understood, that this can occur across two or more documents, but can also occur within a single document. So, the same result described above would apply if one document read, in its entirety, "John gave Mary a kiss, and then Mary gave John a kiss." Cursor placed over any "John" highlights all "Johns," over any "Mary" highlights all "Marys," etc. If the cursor is placed over the term "Force Majeure" what happened to be the opening definitions of a legal contract, all occurrences of that term are highlighted. As such, this active highlighting function that is used for simple comparison in one situation (e.g., that of FIG. 11) is the same tool that is used if one wishes to examine text movement within a given subsection, and is also the basic tool used to examine how certain terms are utilized and defined in a single document or across multiple documents.

The overall highlighting scheme chosen for a given implementation of this invention can take the form of what is shown as an example here (i.e., rectangles around differences, nothing for similarities, and underlines for actively selected similarities), or any other form obvious to someone of ordinary skill. Thus, such highlighting schemes can involve outputting different fonts, different colors, different word cases, different emphasis (e.g., bold, italic, underlines, superscripts, subscripts, flashing text, etc.), and any other sort of output differences, in any and all combinations with one another, all within the context of this disclosure and its associated claims. All that is required is that differences be highlighted differently than similarities, no mater what highlighting scheme is chosen. The use of "addition" markers and "deletion" markers such as discussed above, is preferred, but not required. Also, it is contemplated within the scope of this disclosure and its associated claims that a user can optionally choose from a broad range of highlighting schemes by setting his or her "highlighting preferences" accordingly.

Now we turn to the optional context information 1002 and 1004 in the upper two lines of FIG. 10. Underlining is used here, as an example, not a limitation, to designate that this is context information, as opposed to comparison information. This further outputs to the user which subsection headers these outputted subsections are part of, as well as the context within the overall document structure. Thus, the user can tell from FIG. 10 that the material highlighted for differences and similarities from first document 1, is part of a document titled "CHAIR," and is within a first level subsection titled "Background of the invention," and that the material highlighted for differences and similarities from second document 2, is part of a document titled "IMPROVED SEATING DEVICE," and is within a first level subsection titled "Background." Again, this is not comparison information, this is information to establish the document structural context within which the outputted comparison is taking place. Thus, the output of FIG. 10 contains two types of information: information juxtaposing the output of the selected document subsections relative to one another to visually emphasize a comparison (similarities and changes) therebetween; and optional context information outputted in conjunction with the associated subsections. Note, therefore, that the headers themselves may be repeated: once to visually emphasize the comparison between headers from one document to the next (102 and 202); and once to provide context information (1002 and 1004).

Let us now suppose that the user wishes to simply generate a "substitution list" that shows the changes that have occurred between the two documents under consideration (or among three or more documents in the general case), for either the entirety, or selected subsections, of these documents. Let us suppose, for example, that the user wants to view a substitution list of the changes found comparing the subsection "CHAIR /Background of the invention" to "IMPROVED SEATING DEVICE/Background," that is, the subsections illustrated in FIGS. 10 and 11. Such as substitution list is illustrated by FIG. 12. While there are many options for arriving at the substitution list of FIG. 12 that would be apparent to someone of ordinary skill, all of which are contemplated within the scope of this disclosure and its associated claims, we discuss below an exemplary process of how this might be done.

As an illustrative example of how to do this, the user goes back to the output of any of FIGS. 4, 5 or 6 (any mapping screen that shows the headers of the two desired subsections juxtaposed to one another) and selects the comparison selection means 410 juxtaposed to "Background of the invention" and "Background," though in a different manner than was used earlier to jump to the output of FIG. 10. For example, not limitation, if the user from FIGS. 4, 5 or 6 used a "left click" of a mouse on comparison selection means 410 to get to the output of FIG. 10, the user might use a "right click" to jump instead to the output of FIG. 12. Or, a right click may cause a menu to be outputted in the manner that is customary in the art for right clicks, and then the user would select an option from that menu to bring up the output of FIG. 12. Again, many similar navigational alternatives will be apparent and are considered to fall within the scope of this disclosure and its associated claims.

Alternatively, working from the output of FIG. 10, which also has a comparison selection means 410 button illustrated astride the headers that provide context information, the user similarly uses the computerized input device to select the comparison selection means 410 (e.g., circle) juxtaposed to "Background of the invention" and "Background" according to some suitable navigational scheme (left click, right click, menus, etc.), which causes a navigational jump to the output of FIG. 12.

Once the user arrives at the screen of FIG. 12, irrespective of the navigational scheme used to get to this output, the user sees a substitution list 1200. In this list, which illustrates one example of how this substitution information may be provided, every addition, replacement, and deletion as between the selected subsections is summarized, along with an optional numeric tally showing the frequency of each said addition, replacement, and deletion. Note, in FIG. 12, all of the changes occur one time each. However, it is to be expected that for most documents, certain changes will occur more than once, and that this numeric tally will be an important item of information to the user reviewing the documents. (It is to be observed that a replacement is in fact a combination of a deletion from first document 1 and an addition to second document 2 in the same location. Thus, the replacement summarized by, e.g., the phrase "a halfway was replaced by an intermediate" could also be communicated with a phrase such as "a halfway was deleted; and intermediate was added," that is, by indicating only deletions and additions.)

To the left of each. substitution item of the substitution list is an optional substitution item priority selector means— 1202 (the illustrated boxes), to be employed as follows. First, suppose the user is reviewing the two documents to glean from the comparison only the changes that are important to the user. Minor changes are to be ignored, but important changes are to be selected to further emphasis and/or review. So, upon reviewing the substitution list of FIG. 12, the user decides that the only changes of importance are the first two listed changes, and that all others can be ignored. Based on this, the user selects (checks off) each box of priority interest, for example, by a mouse point and click. Thereafter, by virtue of this selection, and until the user instructs otherwise, all other (non-selected) changes will be ignored in the various screen outputs, and only the selected priority changes will be highlighted. This will be referred to as "priority highlighting." Thus, using FIG. 10 as an example, once the selections shown in FIG. 12 are made, the only difference highlighting appearing on a screen such as that of FIG. 10 would be that related to the selections in FIG. 12. All other difference highlighting would cease to appear, or would appear in a different highlighting to indicate that the highlighted matter designates a difference between the documents that the user believes can be ignored. (As earlier, user preferences can be used to establish exactly how this highlighting is to occur.) Also, a method for changing the selections made in FIG. 12 by engaging in certain selections at the output of FIG. 10 might be implemented. For example, if the user changes his or her mind and decided to add (check off) or remove (uncheck) another substitution to the list of FIG. 12, the user might right click on the text of interest in FIG. 10, and, in response to a menu choice, add or remove that text from the checklist of FIG. 12. Again, it is to be understood that the foregoing navigational scheme is just an example and that someone of ordinary skill can readily find other alternatives within the scope of this disclosure and its associated claims.

Suppose now that the user is at the screen of FIG. 12, but wishes to "go to" all occurrences of one of the changes listed in FIG. 12 and see the actual change in the context of the FIG. 10 output. For example, the user wishes to see where "need" was replaced by "become tired and would like." As an example of how to navigate this, it is observed that the numeric tally is underlined, in this case, so as to designate a "hyperlink. " Thus, pointing and clicking (he "1 time:" hyperlink astride the "need was replaced by become tired and would like," causes a jump to the screen of FIG. 10. When the user arrives at the screen of FIG. 10, the words "need" in the first document 1 output and "become tired and would like" in the second document 2 output appear in a different highlighting (for example, flashing on and off, or extra bold, etc.) so as to show the user the context within which the change selected from FIG. 12 occurs. Other substitutions may be left un-highlighted, or highlighted with lesser emphasis relative to the selected substitution. Once again, optional user preferences can be used to specify the highlighting scheme. This will all be referred to as "go-to" output highlighting. If there are multiple occurrences (2 or more times) of a particular selected substitution, the resulting screen shows all occurrences of the selected substitution. Additionally, the user is provided options such as "go to next" and "go to previous" that are known in the art for single documents, but which does not appear to be known for simultaneously jumping through 2 or more documents in parallel.

The subsection comparison illustrated in FIG. 10 was for a single subsection at the lowest (bottom level) node in the document hierarchical structure. That is, from the output of FIG. 4, 5 or 6, the user selected the comparison selection means 410 button juxtaposed to the "Background of the invention" and "Background headers, and there was no "+" or "–" expansion or contraction button juxtaposed to these headers to indicate that these sections have any further substructure.

Let us suppose now that the user wishes to examine changes at a higher level document structure, i.e., at a level that is not a bottom-level mode. For example, suppose the user wishes to examine changes in first document 1 subsection "Detailed description" which is juxtaposed to the second document subsection "Detailed description of the invention." These sections, as indicated by the "+" and "–" buttons in FIGS. 4, 5 and 6, do indeed have substructure and thus are not bottom level nodes. (Recall by the way that here, this substructure originally exists only in first document 1, and is coerced into second document 2. But in many situations, the substructure will originally exist in both documents.) In this event, similarly to what was discussed before, the user simply selects the comparison selection means 412 (e.g., the small circle) astride these headers, resulting in the output of FIG. 13. In FIG. 13, the output compares the entire detailed description section from both documents, over all of the substructure in these "Detailed description" and "Detailed description of the invention" subsections.

FIG. 13, like FIG. 10, shows both context and comparison information. (Recall that the context information, for example, not limitation, is underlined.) This output is similar to that of FIG. 10 and is to be interpreted in the same way. What is different is that several subsections are outputted, since the user, by selecting the "Detailed description" and "Detailed description of the invention" subsections, selected to see all of the lower-level subsections within these selected subsections. Context information is provided in conjunction with each lower level subsection, and a means for jumping to a substitution list like that of FIG. 12 is also provided via the comparison selection means (e.g., small circles).

From here, if the user wants to generate a substitution list encompassing all of the material outputted in FIG. 13, the user would (again, simply as a non-limiting example) point and click on the comparison selection means 412 juxtaposed to the "Detailed description" and "Detailed description of the invention" headers, to bring up a substitution list like that of FIG. 12, but for all of the text shown in FIG. 13. If the user wanted to view the substitution list for just one subsection (e.g., for the subsection associated with the "ii) Legs:" and "First" headers, the user would (for example) point and click on the comparison selection means 1402 juxtaposed to these headers, and would get a narrower substitution list for just the selected sections. Pointing and clicking on the numeric tally hyperlink for a given substitution would show all occurrences of the selected substitution, within all of the subsections that were originally selected for output in FIG. 13. A broad range of navigational options, such as discussed earlier, can all be employed within the scope of this disclosure and its associated claims.

If, on the other hand, the user wants to see a comparison of the entirety of both documents, the user would go to the output of any of FIGS. 3, 4, 5, or 6, and select the comparison selection means 304 astride the header pair "CHAIR" and "IMPROVED SEATING DEVICE", and the result would be an output similar to FIG. 13, but for the entirety of both documents. (It is understood that long documents will not output on a single screen, and that some form of known-or-obvious-in-the-art means for, e.g., "continuous scrolling" or "discrete paging" would be employed, but that this would scroll or page through two or more documents simultaneously, which does not appear to be known. The use of the term "scrolling" herein is to be broadly interpreted, to encompass all known forms of moving serially through a document from front to back or from back to front including discreet paging and continuous scrolling, as well as jumping to a specified location such as "going to" a specified page or searching for a key word or phrase.) Similarly, to output a substitution list analogous to FIG. 12, but for the entirety of both documents, the user would suitably select, for example, any of the selector circles juxtaposed with the "CHAIR" and "IMPROVED SEATING DEVICE" headers on any of the screen outputs of FIGS. 3, 4, 5 or 6. From such a "global" substitution list, the user can select the hyperlink for any given substitution, and receive an output showing all occurrences of the selected substitution throughout the entire pair of documents.

The point is that for a structured document, the user can select to output a comparison or a substitution list of any level of the document, whether that be for a single subsection at the bottom of the document structure, or for the entire document at the very top node of the document structure, or at any level in between, and can navigate around among these various options at whatever structural level has been selected.

Another feature of interest is the use of comparison summaries and similarity indicators. In many instances, the user may desire statistical summary information that enables the user at a glance to see how similar or how different various document sections are relative to one another.

As noted earlier, the process of "mapping" is based on taking certain similarity measures as between the various document subsections. The word counting/percentage of similar words schema outlined above (in combination with stemming, thesaurus use, length of the word strings in matching segments, etc.) is a simple version of such similarity measures, but it is understood that a wide range of statistical techniques for assessing similarity and differences may be employed within the scope of this disclosure and its associated claims. For example, the references: Uri Zernik (editor), "Lexical Acquisition: Exploiting On-Line Resources to Build a Lexicon", Lawrence Erlbaum Assoc, Publishers, Hillsdale, N.J., 1991; Gerard Salton, "Automatic Text Processing: The Transformation, Analysis and Retrieval of Information by Computer", Addison Wesley, Reading Mass., 1989; and Christopher D. Manning and Hinrich Schutze, "Foundations of Statistical Natural Language Processing", The MIT Press, Cambridge, Mass., 1999; all present a range of techniques for similarity measurement that would be suitable for use in connection with the invention disclosed herein. It is to be understood that the use of similarity measures such as those discussed in the references, in combination with the other disclosed and claimed aspects of applicant's invention, is considered to be within the scope of this disclosure and its associated claims.

Regardless of the method by which these similarity measures are taken (and even if several different types of similarity measure are generated), these similarity measures are of interest to the user, and may be outputted in juxtaposition with the headers of the subsections to which they apply. In all of FIGS. 3 through 11 and 13, comparison selection means (e.g., a series of small circles) are illustrated between (or juxtaposed in some suitable configuration relative to) the various header pairs shown on each output. As discussed at length above, this comparison selection means (which is really just a "button" on which a mouse can be pointed and clicked) has been used to initiate certain outputs, such the detailed document comparisons of FIGS. 10, 11 and 13, or the substitution list of FIG. 12. However, in a preferred implementation, the comparison selection means further comprises a similarity measure. That is, rather than a simple circle or similar button which provides no information to the user but is just used to point and click, the comparison selection means doubles to provide information about the similarities and differences between their associated subsections. Alternatively, the similarity measure may be indicated distinctly from the comparison selection means.

Thus, for example, if one were using the simple similarity measure discussed above wherein the subsections outputted in FIG. 10 are 82.2% similar, comparison selection means 410 as it appears in FIGS. 4, 5, 6, 10 and 11 would comprise this number, 82.2%, or a similar indicator (e.g., 0.822, a pie chart with 82.2% of the pie filled in, etc.), in the form of a hyperlink. Thus, by pointing and clicking on this indicator (whether by left click, right click with menu, or similar means), one jumps to various types of output as outlined above. But, even without a point and click, comparison selection means provides useful information in the form of outputting one or more similarity measures. In this scheme, the circles in FIGS. 3-11 and 13 would instead be a series of percentages, or pie charts, or fraction, or some other similarity/difference measurement, to tell the use at a glance how similar and/or how different the two or more juxtaposed sections actually are. Thus, a user looking at the output of FIG. 6, for example, would see 12 different percentages, one for each header pair, showing how similar the associated subsections are. Then, the user can use these as a basis for prioritizing which subsections to "drill down" into first, bases on the information provided in this similarity measure.

Again, it is understood that a broad range of similarity measures can be taken and outputted in this or a similar manner, all within the scope of this disclosure and its associated claims. Similarly, if there are several similarity measures available from a particular implementation, the user can establish preferences about which of these similarity measures are to be outputted. In some cases, where the user's interest is "differences," the user might select a similarity measure that is particularly indicative of the difference between the documents. In other situations, if "similarity" is the main interest, then the similarity measure preferred for output would be one that emphasizes similarity.

A good example of the helpfulness of this type of this statistical summary information is to consider, for example, a copyright attorney who is looking to ascertain the degree to which a client's document (first document) has been "copied" or "plagiarized" by a possibly-infringing (second) document. The mapping method of the invention, the results of which are outputted in FIGS. 3 through 9, helps to uncover any reordering and restructuring that may have taken place in the infringing document to "hide" the copying. The further navigation to comparison outputs such as shown in FIGS. 10 through 13 provides further useful information to assess copying, in detail. However, all of this, coupled with the output of various summary similarity measures on a section-by-section basis, as well as document-wide and at all levels of substructure, provides a truly comprehensive picture of whether, where, and to what degree, first document 1 has been copied by second document 2.

Figure 14:
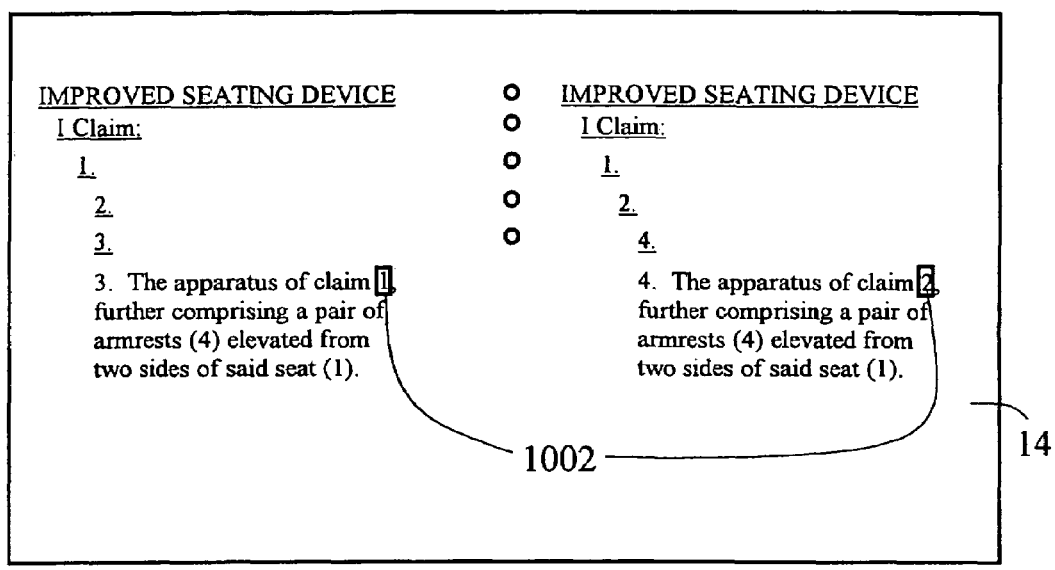
FIG. 14 illustrates an intra-document variation of the invention.

Until this point, we have examined mapping and comparison involving two or more documents, that is, inter-document mapping and comparison. However, there may also be circumstances in which the user will wish to compare two different subsections within the same document, that is, where the use desires to perform an intra-document comparison. FIG. 14 illustrates an intra-document variation of the invention.

As has been the case all along, there are many navigational options for reaching the screen output of FIG. 41, and we shall discuss one exemplary option here. Starting from a document outline that is expanded to show two different subsections to be compared, both within the same document, such as the right-side column in FIG. 6, the user selects two subsections to be compared with one another, using a range of means known in the art that are suitable for such a purpose. For example, if the user wanted to compare claim 3 with claim 4, the user would first select claim 3, and then select claim 4, for example, by right or left clicking on each, and possibly selecting from a menu that provides an "intra-document comparison" option. That would bring up a screen output such as that of FIG. 14 where these two claims are compared with one another. It is worth noting that the left-side column in FIG. 6 is irrelevant for this purpose and thus all that is really needed is the right-side column. In short, one can navigate to the output of FIG. 14 from a conventional hierarchical output of just the one document for which the inter-document comparison is desired.

The output of FIG. 14 is similar to and carries with it the same functionality as that of FIGS. 10, 11 and 13, with optional context information, and with difference highlighting 1002 emphasizing the differences between the two subsections selected for comparison. Features like active highlighting, substitution lists, etc., are similarly available. In this example, the only difference is the dependency of claim 3 on claim 1, and of claim 4 on claim 2. In the specialized context of patent claiming, this identifies claims 3 and 4 as effectively being a single claim multiply-dependent on claims 1 and 2. Note also that claim 4 is indented with respect to claim 2 to denote that it is part of the hierarchical structure under claim 2, but that claim 3 is indented with respect to claim 1, not claim 2, to denote that it is part of the hierarchical structure under claim 1.

FIGS. 15 and 16 are actual screen shots taken from a prototype reduction to practice of the invention for a complex legal document with a great deal of substructure. FIG. 15 shows the "mapped" (table of contents) view of FIGS. 3-9, while FIG. 16 shows the comparison view of FIGS. 10, 11 and 13. In FIG. 15, the reader will note the "coercion" in the subservient document (right hand column) of the headers of the Article III, Section 3.1 subsection to the structure of the dominant document (left hand column), as discussed above. Also appearing in the middle column is a similarity measure. By pointing and clicking on the similarity measure between the Article II headers, and by then scrolling to the bottom of the screen, one arrives at the comparison display of FIG. 16. It is to be observed how the "differences" are highlighted differently than the similarities.

Although this disclosure has discussed certain implementations of methods for navigating from one screen to the next, it is understood that many variations and substitutions for navigating from one type of screen output to the next will be apparent to someone of ordinary skill, and all that such variations are to be considered within the scope of this disclosure and its associated claims.

It is understood that although the preferred "juxtaposition" for the various comparisons is horizontal, other juxtapositions which serve to suitably visually emphasize the mapping and comparisons being displayed are equally regarded to be within the scope of this disclosure and its associated claims.

It is important to point out that mapping and comparison functions and outputs disclosed herein can readily be implemented in a stand alone document comparison system, without any text editing capability. Conversely, it is to be understood within the scope of this disclosure and its associated claims, that these functions and outputs can also be implemented as part of a text editing and/or work sharing system in which a single user, or multiple users in a workgroup, can edit text in conjunction with making use of the mapping and comparison functions disclose herein. When used as part of a text editing/work sharing system, the mapping and comparison functions and outputs disclosed herein may be part and parcel of such a system, or may be a "plug-in" module that a user can separately add to augment such a system.

It is also to be understood that in today's computing and telecommunications environment, there are many ways to distribute the computer processing required to implement the mapping and comparison functions and outputs disclosed herein. Of course, the entire invention as herein disclosed may be embodied in software installed directly on an end user's workstation. Or, it can be used in a network environment in a virtually limitless range of configurations. For example, all or most of the software and hardware can reside on a server (or on multiple servers) that are remote from the end user. The end user may then upload documents to the server(s) and instruct the server to carry out the mapping and comparison of the uploaded documents. Then, the server simply would transmit the necessary information to the end user's workstation thereby causing an output—albeit a remote output—of the results of the mapping and comparison with suitable juxtaposition. Similarly, a server would act in response to a computerized input device—albeit a remote input device—in order to perform various tasks associated with the invention. It is to be clearly understood that this disclosure and its associated claims are understood and intended to apply to all such situations, irrespective of how the processing and output and input are distributed among one or more computerized devices using modem telecommunications and computing systems, or may reside on a single computerized device without any communications connection to any other computerized device. Of course, the division of functions as between hardware and software is similarly irrelevant to the application of this disclosure and its associated claims.

The underlying computer system itself, of course, comprises the necessary computer storage, memory, and processor capability necessary to store and access the underlying documents, perform necessary matching, comparison and other operations involving these documents as discussed throughout this disclosure, and comprises the computerized input devices (e.g., mouse, keyboard, etc.) and output devices (e.g., display screen) required to accept directions form the user and generate the desired output. One may use a single general purpose computer, or as noted above, a plurality of computers interconnected with one another wherein various storage, processing, input and output tasks are spilt among more than one computer. Indeed, there are an endless variety of ways in which this device, system and method may be reduced to practice using computerized devices and methods well-known to those or ordinary skill, all of which are regarded to be within the scope of this disclosure and its associated claims.

It is also important to understand the use of the term "headers" and "subsections" as those terms are used in this disclosure and the associated claims, and as those terms are intended to be understood and interpreted. Headers, as has been discussed at length herein, can be explicit or implicit. The same is true for subsections. An explicit header is one that is already part of the document to begin with such as the headers associated with an explicit table of contents, or such as text that is numbered and/or set forth with certain highlighting characteristics or is somehow "tagged" as a header in the original document text. The subsection associated with such an explicit header is an explicit subsection. An implicit header, on the other hand, is one that is not necessarily in the document to begin with, but is either inferred from the document because the computerized system is programmed to make such an inference (e.g., a claim number is an implicit header in the examples shown), or it is coerced into the document as a consequence of mapping two or more documents together. This includes the "null" headers that are used as placeholders when two document subsections map together, but one of them does not start off with a suitable header, or one document contains a subsection for which the other document simply has no corresponding subsection. An implicit subsection is one that is created in the course of the mapping, in association with an implicit header. For example, in FIG. 5, an implicit heading, namely, a second "Summary" heading, was created for the sentence "This enables a person to sit in an intermediate position between standing, and lying down or sitting on a rug." This sentence, while not originally a subsection in its own right, was coerced into being an implicit subsection in order to facilitate the mapping and output to the first (dominant) document. Thus, the use of the terms "headers" and "subsections" in the claims should not be interpreted as being restricted only to explicit headers and subsections, but also includes the various types of implicit headers and subsections illustrated herein.

It is also important to understand that when it is said in this disclosure and it associated claims that a series of document headers and/or a series of document subsections is "outputted," that the material to be outputted may be too large to fit in its entirely onto the window of the computerized output device, and that only a portion of this material will actually appear on the output screen at any one time. The user, as is conventional in the art, would then use scrolling or paging or similar functions to move through the material on the screen. Thus, in no way should a statement that some text or header material is "outputted" be interpreted to require that the entirety of that material must be outputted so as to fit into a single output screen. Rather, it is to be understood to mean that some or all of that material is visible on the output device, but that all of the material is available for "output" insofar as it can be scrolled to or paged to at will using methods well known in the art. It is also to be understood that "output" is to be broadly understood to encompass all known means for representing information inside of a computer to a user, such as but not limited to computer display screen, and hardcopy material rendered on a computer printer.

While only certain preferred features of the invention have been illustrated and described, many modifications and changes will occur to those skilled in the art. It is, therefore, to be understood that the appended claims are intended to cover all such modifications and changes as fall within the true spirit of the invention.

The invention claimed is:

1. A method for comparing sections of text in one or more documents, the method executing in a computer system, the computer system including a display screen coupled to a processor, the method comprising:

selecting, by using the processor, a first heading of a first text subsection and a second heading of a second text subsection from among a group of 3 or more text subsections, wherein the first heading is not similar to the second heading, wherein the selecting is performed without the user manually selecting said first or second text subsections;

automatically determining, by using the processor without user input, a similarity measure for each pair of text subsections in the group, wherein a particular similarity measure results in a similarity rating for the first and second text subsections that is higher than similarity ratings for other pairs of text subsections in the group even when the first and second headings are not similar, wherein the similarity measure is derived from text subsections and headings;

determining, by using the processor, and based on the similarity measure, that the first text subsection is more similar to the second text subsection than to other text subsections in the group;

displaying, by using the processor, the first and second non-similar headings on the display screen to indicate that the first and second text subsections are most similar;

wherein a first document includes a first plurality of text subsections, wherein a second document includes a second plurality of text subsections, the method further comprising:

accepting, by using the processor, a signal from a user input device to designate the first document as a dominant document;

determining, by using the processor, a mapping among the first and second pluralities of text subsections;

displaying, by using the processor, the first headings of the first text subsections in an order in which the first headings appear in the dominant document; and displaying, by using the processor, the second headings of the second text subsections in an order according to the determined mapping, wherein the second headings are displayed in an order that is not the same as an order in which the second headings appear in the second document.

2. The method of claim 1, further comprising:
displaying, by using the processor, the first and second headings in adjacency on the display screen.

3. The method of claim 2, further comprising:
displaying, by using the processor, the first and second headings in horizontal juxtaposition on the display screen.

4. The method of claim 1, further comprising:
displaying, by using the processor, first and second headings in adjacency on the display screen, wherein headings associated with text sections that are most similar are displayed with greater adjacency.

5. The method of claim 4, further comprising:
displaying, by using the processor, headings of most similar text sections in horizontal juxtaposition on the display screen.

6. The method of claim 1, further comprising:
making, by using the processor, a determination of the similarity measure by forming a ratio of matching words to total words, wherein the ratio includes words in the first and second text subsections and in the first and second headers.

7. The method of claim 6, further comprising:
establishing, by using the processor, one of the documents as a dominant document; and
using, by using the processor, the dominant document to define a sequence as a basis by which out of sequence text material can be determined.

8. The method of claim 7, further comprising:
matching, by using the processor, out of sequence text material in a compare document to text material in the dominant document.

9. An apparatus for comparing sections of text in one or more documents, the apparatus comprising:
a processor;
a display screen coupled to the processor;
a machine-readable storage medium including instructions executable by the processor for:
selecting, by using the processor, a first heading of a first text subsection and a second heading of a second text subsection from among a group of 3 or more text subsections, wherein the first heading is not similar to the second heading, wherein the selecting is performed without the user manually selecting said first or second text subsections;
automatically determining, by using the processor without user input, a similarity measure for each pair of text subsections in the group, wherein a particular similarity measure results in a similarity rating for the first and second text subsections that is higher than similarity ratings for other pairs of text subsections in the group even when the first and second headings are not similar, wherein the similarity measure is derived from text subsections and headings;
determining, by using the processor, and based on the similarity measure, that the first text subsection is more similar to the second text subsection than to other text subsections in the group;
displaying, by using the processor, the first and second non-similar headings on the display screen to indicate that the first and second text subsections are most similar;
wherein a first document includes a first plurality of text subsections, wherein a second document includes a second plurality of text subsections, the machine-readable storage medium further comprising instructions executable by the processor for:

accepting, by using the processor, a signal from a user input device to designate the first document as a dominant document;
determining, by using the processor, a mapping among the first and second pluralities of text subsections;
displaying, by using the processor, the first headings of the first text subsections in an order in which the first headings appear in the dominant document; and
displaying, by using the processor, the second headings of the second text subsections in an order according to the determined mapping, wherein the second headings are displayed in an order that is not the same as an order in which the second headings appear in the second document.

10. A machine-readable storage medium including instructions executable by a processor for comparing sections of text in one or more documents, the machine-readable storage medium comprising:
one or more instructions for selecting, by using the processor, a first heading of a first text subsection and a second heading of a second text subsection from among a group of 3 or more text subsections, wherein the first heading is not similar to the second heading, wherein the selecting is performed without the user manually selecting said first or second text subsections;
one or more instructions for automatically determining, by using the processor without user input, a similarity measure for each pair of text subsections in the group, wherein a particular similarity measure results in a similarity rating for the first and second text subsections that is higher than similarity ratings for other pairs of text subsections in the group even when the first and second headings are not similar, wherein the similarity measure is derived from text subsections and headings;
one or more instructions for determining, by using the processor, and based on the similarity measure, that the first text subsection is more similar to the second text subsection than to other text subsections in the group;
one or more instructions for displaying, by using the processor, the first and second non-similar headings on the display screen to indicate that the first and second text subsections are most similar;
wherein a first document includes a first plurality of text subsections, wherein a second document includes a second plurality of text subsections, the machine-readable storage medium further comprising:
one or more instructions for accepting, by using the processor, a signal from a user input device to designate the first document as a dominant document;
one or more instructions for determining, by using the processor, a mapping among the first and second pluralities of text subsections;
one or more instructions for displaying, by using the processor, the first headings of the first text subsections in an order in which the first headings appear in the dominant document; and
one or more instructions for displaying, by using the processor, the second headings of the second text subsections in an order according to the determined mapping, wherein the second headings are displayed in an order that is not the same as an order in which the second headings appear in the second document.

* * * * *